United States Patent
Li et al.

(10) Patent No.: US 9,176,308 B2
(45) Date of Patent: Nov. 3, 2015

(54) ZOOM LENS

(71) Applicants: TAMRON CO., LTD., Saitama-shi, Saitama (JP); SONY CORPORATION, Tokyo (JP)

(72) Inventors: Dayong Li, Saitama (JP); Daisuke Kuroda, Kanagawa (JP); Takuya Kato, Tokyo (JP)

(73) Assignees: TAMRON CO., LTD., Saitama-shi (JP); SONY CORPORATION, Tokyo (JP)

( * ) Notice: Subject to any disclaimer, the term of this patent is extended or adjusted under 35 U.S.C. 154(b) by 5 days.

(21) Appl. No.: 14/172,105

(22) Filed: Feb. 4, 2014

(65) Prior Publication Data

US 2014/0218800 A1 Aug. 7, 2014

(30) Foreign Application Priority Data

Feb. 5, 2013 (JP) .................................. 2013-020888

(51) Int. Cl.
*G02B 27/64* (2006.01)
*G02B 15/173* (2006.01)

(52) U.S. Cl.
CPC ............ *G02B 15/173* (2013.01); *G02B 27/646* (2013.01)

(58) Field of Classification Search
CPC ... G02B 15/173; G02B 27/646; G02B 13/009
USPC .......................... 359/554–557, 676, 683–684; 396/72–88; 348/240.99–240.3; 348/335–369
See application file for complete search history.

(56) References Cited

U.S. PATENT DOCUMENTS

| | | | |
|---|---|---|---|
| 7,126,758 B2 * | 10/2006 | Fujimoto et al. | ............... 359/676 |
| 2009/0290232 A1 | 11/2009 | Hagiwara | |
| 2011/0026133 A1 | 2/2011 | Fujisaki | |
| 2012/0087016 A1 | 4/2012 | Ito | |

FOREIGN PATENT DOCUMENTS

| | | |
|---|---|---|
| JP | 2009-282398 A | 12/2009 |
| JP | 2011-033868 A | 2/2011 |
| JP | 2012-098699 A | 5/2012 |

* cited by examiner

*Primary Examiner* — Ricky Mack
*Assistant Examiner* — Kristina Deherrera
(74) *Attorney, Agent, or Firm* — Foley & Lardner LLP

(57) ABSTRACT

A zoom lens includes sequentially from an object side, a first lens group having a positive refractive power, a second lens group having a negative refractive power, a third lens group having a positive refractive power, a fourth lens group having a negative refractive power, a fifth lens group having a positive refractive power, and a sixth lens group having a negative refractive power. The zoom lens varies the interval between the lens groups to perform zooming; shifts the second lens group in a direction substantially orthogonal to the optical axis to correct image blur occurring with optical system vibrations; and satisfies given conditions, enabling a compact size and a high zoom ratio to be achieved while improving imaging performance.

5 Claims, 10 Drawing Sheets

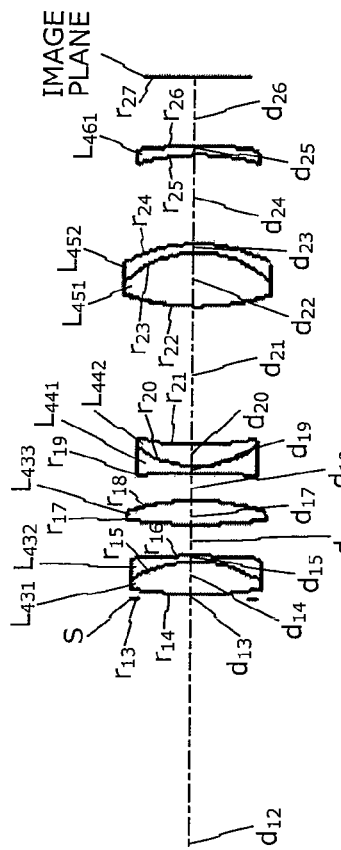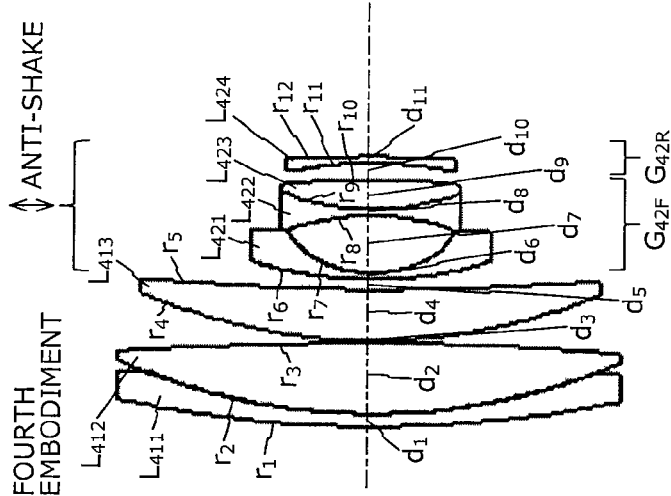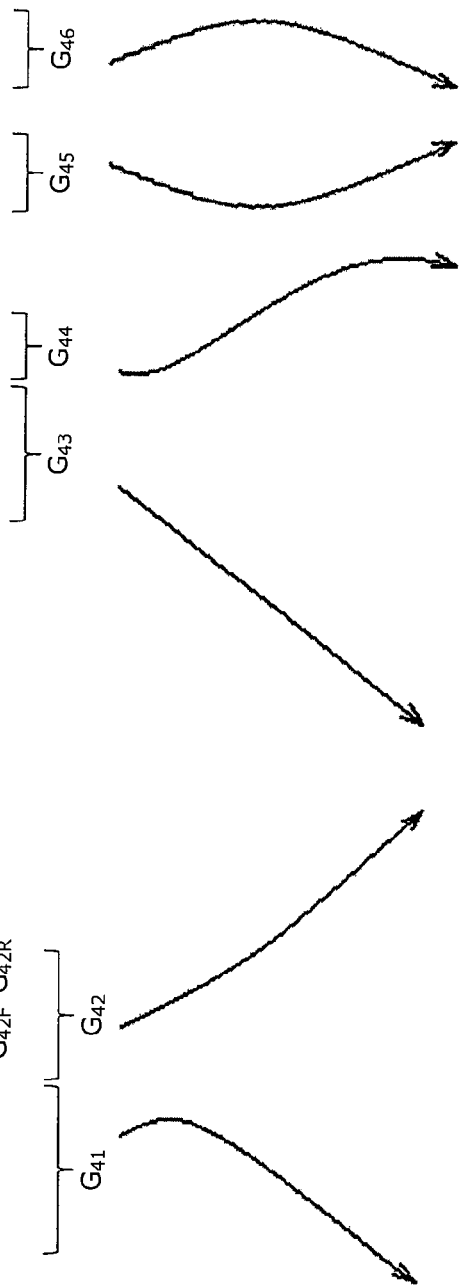
FIG.7

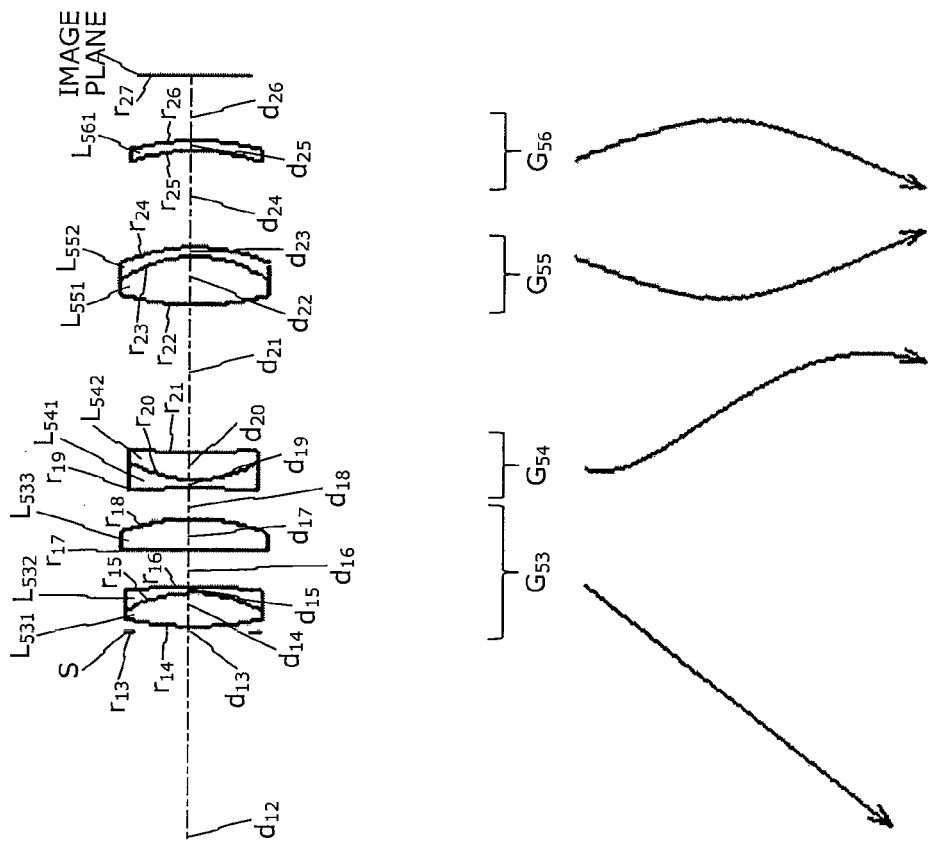
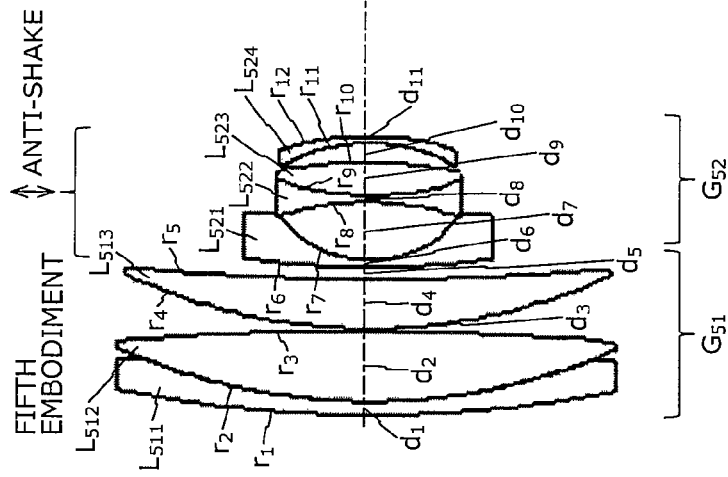
FIG.9

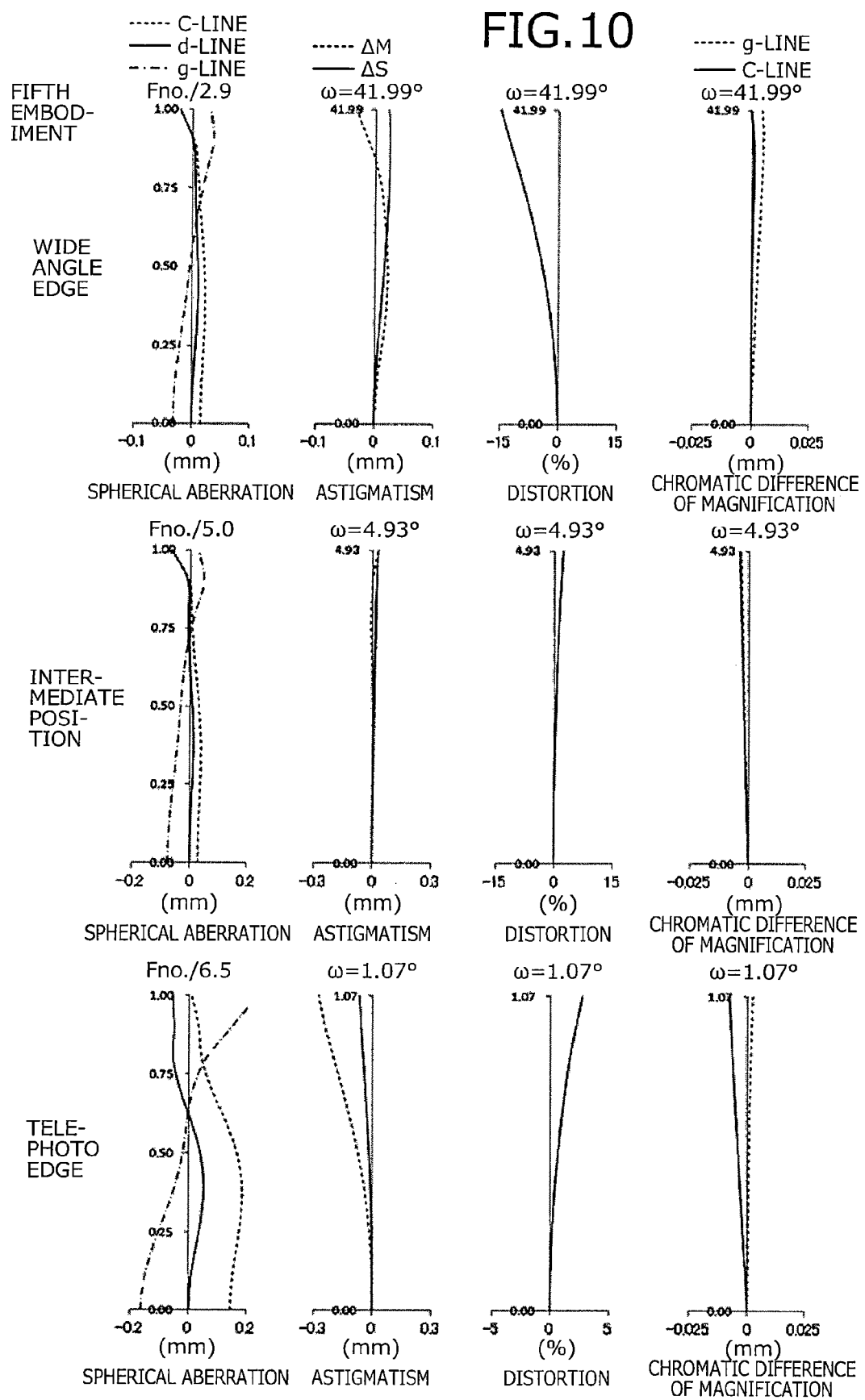

ZOOM LENS

BACKGROUND OF THE INVENTION

1. Field of the Invention

The present invention is related to a compact zoom lens that achieves wide angles, has a high zoom ratio, and is suitable for digital imaging apparatuses such as digital still cameras and digital video cameras.

2. Description of the Related Art

Reductions in the size of digital imaging apparatuses such as digital still cameras, broadcast cameras, and surveillance cameras have advanced. Accordingly, zoom lenses that are compact and, have a high zoom ratio and high imaging performance are demanded as imaging optical systems for use on such digital imaging apparatuses.

To address such demands, several zoom lenses are known that sequentially include from an object side, a first lens group having a positive refractive power, a second lens group having a negative refractive power, and a third lens group having a positive refractive power that is followed by 1 or more lens groups (see, for example, Japanese Patent Application Laid-Open Publication Nos. 2011-33868, 2012-98699, and 2009-282398).

The zoom lens recited in Japanese Patent Application Laid-Open Publication No. 2011-33868 has a zoom ratio on the order of 9 to 41.2, and an angle of view at the wide angle edge on the order of 68.4 to 79.6 degrees. The zoom lens recited in Japanese Patent Application Laid-Open Publication No. 2012-98699 has a zoom ratio on the order of 33.5 to 44.25, and an angle of view at the wide angle edge on the order of 74 to 84 degrees. The zoom lens recited in Japanese Patent Application Laid-Open Publication No. 2009-282398 has a zoom ratio on the order of 9.7 to 19.4, and an angle of view at the wide angle edge on the order of 74 to 84 degrees.

Although the zoom lenses disclosed in Japanese Patent Application Laid-Open Publication Nos. 2011-33868 and 2012-98699 have a sufficiently large angle of view at the wide angle edge and a sufficiently large zoom ratio, the maximum image height at the wide angle edge cannot be said to be sufficiently large and high imaging performance cannot be achieved. If the image height at the wide angle edge is increased, the diameter of the optical system has to be increased. However, if the diameter of the optical system is increased, the overall length of the optical system accordingly increases. In either case, a compact size for the optical system cannot be maintained, making use on a compact imaging apparatus difficult.

Further, the zoom lens disclosed in Japanese Patent Application Laid-Open Publication No. 2009-282398 corrects image blur by moving the third lens group in a direction orthogonal to the optical axis. Nonetheless, in the zoom lens, the anti-shake coefficient (amount that image shifts/amount that anti-shake group is shifted) of the third lens group at the telephoto edge decreases and therefore, the distance that the third lens group is moved to prevent blurring at the telephoto edge increases. As a result, the imaging performance when blur is corrected deteriorates. Further, a large area for the third lens group to move has to be established, inviting increases in the size of the optical system. In addition, the mechanism for driving the third lens group also has to be of a larger size.

Since the zoom ratio of the zoom lens disclosed in Japanese Patent Application Laid-Open Publication No. 2009-282398 is on the order of 9.7 to 19.4, compared to that of the zoom lenses disclosed in Japanese Patent Application Laid-Open Publication Nos. 2011-33868 and 2012-98699, the zoom ratio is insufficient. However, if the zoom ratio is increased, the distance that the lens group for zooming moves increases and the overall length of the optical system increases, which hinders attempts to reduce the size of the optical system.

SUMMARY OF THE INVENTION

It is an object of the present invention to at least solve the above problems in the conventional technologies.

A zoom lens according to one aspect of the present invention includes sequentially from an object side a first lens group having a positive refractive power; a second lens group having a negative refractive power; a third lens group having a positive refractive power; a fourth lens group; and at least one lens group subsequent to the fourth lens group toward an image plane. The zoom lens zooms between a wide angle edge and a telephoto edge by varying intervals between the lens groups, along a direction of an optical axis; and corrects hand-shake that occurs with optical system vibration, by shifting any one among the entire second lens group and a portion of lenses forming the second lens group, in a direction that is substantially orthogonal to the optical axis. The zoom lens satisfies conditional expression (1) $0.5 \leq D2W \times (-F2)/(Ft \times \tan(\omega w)) \leq 2.0$ and condition expression (2) $90 \leq (F1 \times Ft)/(-F2 \times F3) \leq 200$, where D2W is an interval between the second lens group and the third lens group at the wide angle edge, F1 is the focal length of the first lens group, F2 is the focal length of the second lens group, F3 is the focal length of the third lens group, Ft is the focal length of the optical system overall at the telephoto edge, and $\omega w$ is a half-angle at the wide angle edge.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a cross sectional view along the optical axis, depicting a configuration of the zoom lens according to a fourth embodiment;

FIG. 9 is a cross sectional view along the optical axis, depicting a configuration of the zoom lens according to a fifth embodiment; and FIG. 10 is a diagram of various types of aberration in the zoom lens according to the fifth embodiment.

DETAILED DESCRIPTION OF THE PREFERRED EMBODIMENTS

Figure 1:
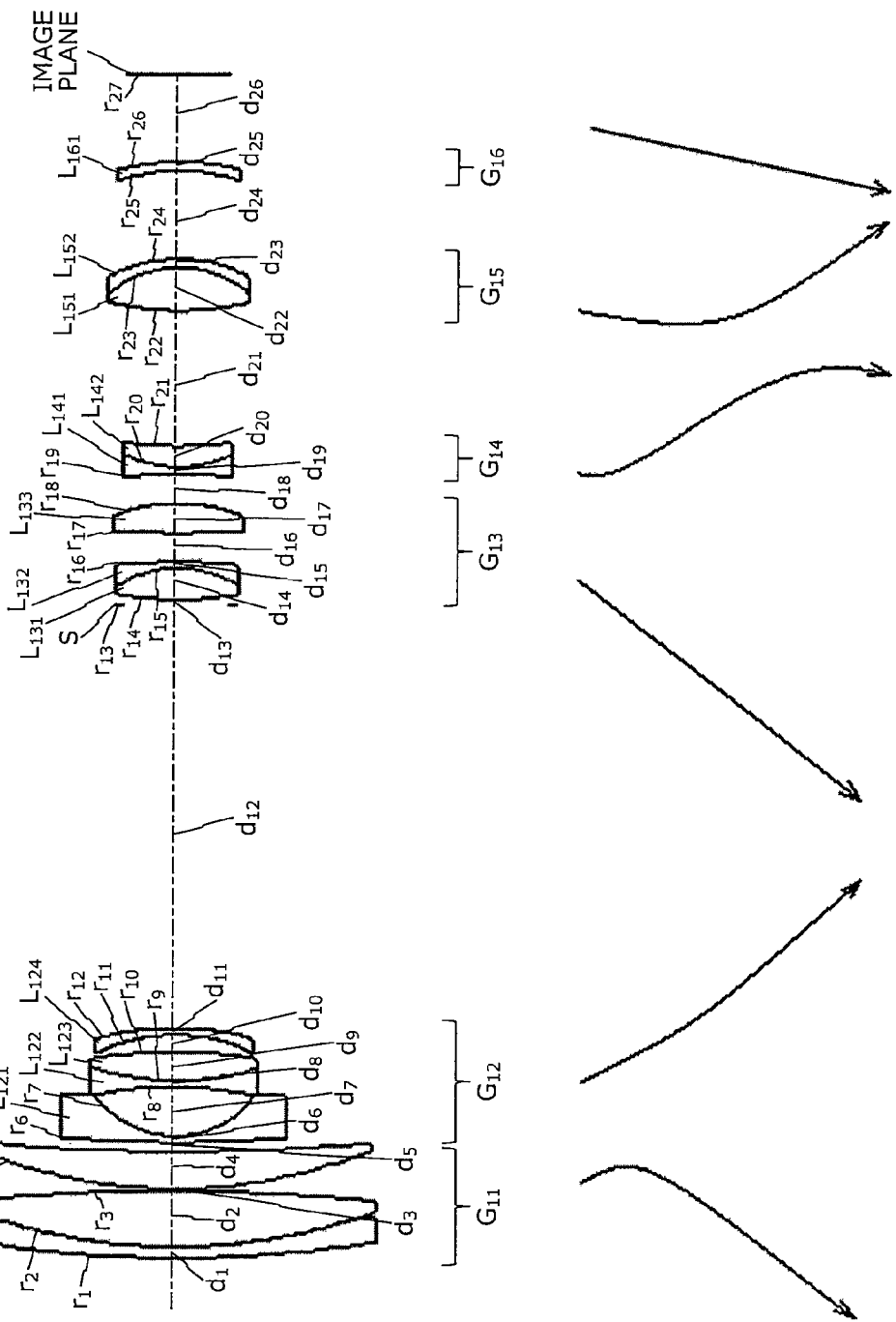
FIG. 1 is a cross sectional view along an optical axis, depicting a configuration of a zoom lens according to a first embodiment.

Embodiments of a zoom lens according to the present invention will be described in detail with reference to the accompanying drawings.

A zoom lens according to the present invention includes sequentially from an object side, a first lens group having a positive refractive power, a second lens group having a negative refractive power, a third lens group having a positive refractive power, a fourth lens group, and 1 or more lens groups subsequent to the fourth lens group, toward an image plane. Zooming from a wide angle edge to a telephoto edge is performed by changing intervals between the lens groups, along a direction of the optical axis. Image blur that occurs with optical system vibration consequent to hand-shake is corrected by shifting (moving) the entire second lens group or a portion of the lenses forming the second lens group, in a direction that is substantially orthogonal to the optical axis. The fourth lens group may have a negative refractive power.

One object of the present invention is to provide a compact zoom lens having a high zoom ratio and a favorable anti-shake correction function. To achieve such an object, the following conditions are set.

In the zoom lens according to the present invention, the following conditional expressions are preferably satisfied, where D2W is the interval between the second lens group and the third lens group at the wide angle edge; F1 is the focal length of the first lens group; F2 is the focal length of the second lens group; F3 is the focal length of the third lens group; Ft is the focal length of the optical system overall at the telephoto edge; and ωw is the half-angle at the wide angle edge.

$$0.5 \leq D2W \times (-F2)/(Ft \times \tan(\omega w)) \leq 2.0 \tag{1}$$

$$90 \leq (F1 \times Ft)/(-F2 \times F3) \leq 200 \tag{2}$$

Conditional expression (1) prescribes a condition to improve imaging performance, facilitated by reductions in the diameter and overall length of the optical system.

Below the lower limit of conditional expression (1), the interval between the second lens group and the third lens group at the wide angle edge becomes too narrow, or the power (inverse of the focal length) of the second lens group becomes too strong. In some cases, both may occur. Therefore, although reducing the overall length of the optical system is advantageous, chromatic difference of magnification and coma occurring at the wide angle edge become difficult to correct. Meanwhile, above the upper limit of conditional expression (1), although the correction of various types of aberration becomes favorable, the diameter of the second lens group increases, making the second lens group heaving. In the zoom lens according to the present invention, the entire second lens group or a portion of the lenses forming the second lens group has a function as an anti-shake group, and corrects image blur that occurs with optical system vibrations. Consequently, if the weight of the anti-shake group increases, the power consumption of the driving mechanism that drives the anti-shake group also increases, and therefore, is not desirable.

By satisfying conditional expression (1) within the following range, even more favorable effects can be expected.

$$0.8 \leq D2W \times (-F2)/(Ft \times \tan(\omega w)) \leq 1.8 \tag{1a}$$

By satisfying the range prescribed by conditional expression (1a), a smaller diameter and shorter overall length of the optical system can be facilitated while enabling improved imaging performance.

By satisfying conditional expression (1a) within the following range, yet even more favorable effects can be expected.

$$1.0 \leq D2W \times (-F2)/(Ft \times \tan(\omega w)) \leq 1.75 \tag{1b}$$

By satisfying the range prescribed by conditional expression (1b), a smaller diameter and a shorter overall length of the optical system can be facilitated while enabling even further improvements in imaging performance.

Conditional expression (2) prescribes a condition for achieving both a high zoom ratio and compact size of the zoom lens while improving imaging performance.

Below the lower limit of conditional expression (2), the power of the second lens group and of the third lens group becomes too weak, making both a high zoom ratio and compact size (particularly the second lens group) difficult to achieve. Meanwhile, above the upper limit of conditional expression (2), although both a zoom ratio and a compact size of the zoom lens can be easily achieved, spherical aberration, coma, and chromatic difference of magnification become difficult to correct.

By satisfying conditional expression (2) within the following range, even more favorable effects can be expected.

$$95 \leq (F1 \times Ft)/(-F2 \times F3) \leq 170 \tag{2a}$$

By satisfying the ranges prescribed by conditional expression (2a), both a high zoom ratio and a compact size of the zoom lens can be achieved while enabling imaging performance to be improved further.

By satisfying conditional expression (2a) within the following range, yet even more favorable effects can be expected.

$$102 \leq (F1 \times Ft)/(-F2 \times F3) \leq 150 \tag{2b}$$

By satisfying the range prescribed by conditional expression (2b), both a high zoom ratio and a compact size of the zoom lens can be achieved while enabling even further improvements in imaging performance.

In the zoom lens, the following conditional expression is preferably satisfied, where BXt2 is the anti-shake coefficient (amount of image point shift/amount that anti-shake group is shifted) for the entire second lens group or a portion of the lenses forming the second lens group, at the telephoto edge; and ωw is the half-angle at the wide angle edge.

$$3.1 \leq BXt2 \times \tan(\omega w) \leq 10 \tag{3}$$

Conditional expression (3) prescribes a condition for implementing a zoom lens that maintains a small optical system diameter while having favorable imaging performance at wide angles, by controlling the shift amount that the entire second lens group or a portion of the lenses forming the second lens group is shifted when image blur at the telephoto edge is corrected.

Below the lower limit of conditional expression (3), the anti-shake coefficient for the entire second lens group or a portion of the lenses forming the second lens group, which has a function as the anti-shake group, becomes too small. In particular, the distance that the anti-shake group is shifted when image blur at the telephoto edge is corrected becomes great. Consequently, the optical system diameter increases and as a result, the driving mechanism that drives the anti-shake group also has to be larger, which invites increases in the size of the lens barrel that supports the zoom lens and therefore, is not desirable. On the other hand, above the upper limit of conditional expression (3), the anti-shake coefficient of the anti-shake group becomes large, which enables the distance that the anti-shake group is shifted to correct image blur at the telephoto edge to be suppressed and is advantageous in increasing the wide angle views of the optical system. Nonetheless, since the power of the second lens group becomes too strong, various types of aberration occurring at the wide angle edge become difficult to correct and is therefore, undesirable.

By satisfying conditional expression (3) within the following range, even more favorable effects can be expected.

$$3.2 \leq BXt2 \times \tan(\omega w) \leq 8.0 \quad (3a)$$

By satisfying the range prescribed by conditional expression (3a), a compact zoom lens that has even more favorable imaging performance at wide angles can be implemented.

By satisfying conditional expression (3a) within the following range, yet even more favorable effects can be expected.

$$3.3 \leq BXt2 \times \tan(\omega w) \leq 6.0 \quad (3b)$$

By satisfying the range prescribed by conditional expression (3b), a compact zoom lens having yet even more favorable imaging performance can be implemented.

In the zoom lens, the following conditional expression is preferably satisfied, where Z is the zoom ratio; Ymax is the maximum paraxial image height at the wide angle edge; and F2 is the focal length of the second lens group.

$$17 \leq (Z \times Y\max)/(-F2) \leq 35 \quad (4)$$

Conditional expression (4) prescribes a condition for achieving a wide angle zoom lens with a high zoom ratio while improving imaging performance.

Below the lower limit of conditional expression (4), the power of the second lens group becomes too weak, making both a high zoom ratio and wide angle views difficult to achieve on the zoom lens. Meanwhile, above the upper limit of conditional expression (4), although both a high zoom ratio and wide angles can be achieved for the zoom lens, various types of aberration such as chromatic difference of magnification, spherical aberration, etc. become difficult to correct and is therefore, not desirable.

By satisfying conditional expression (4) within the following range, even more favorable effects can be expected.

$$18 \leq (Z \times Y\max)/(-F2) \leq 30 \quad (4a)$$

By satisfying the range prescribed by conditional expression (4a), wide angles and a high zoom ratio of the zoom lens can be achieved while enabling imaging performance to be improved further.

By satisfying conditional expression (4a) within the following range, yet even more favorable effects can be expected.

$$19 \leq (Z \times Y\max)/(-F2) \leq 25 \quad (4b)$$

By satisfying the range prescribed by conditional expression (4b), wide angles and a high zoom ratio of the zoom lens can be achieved while enabling even further improvements in imaging performance.

Further, in the zoom lens, the following conditional expression is preferably satisfied, where F2 is the focal length of the second lens group; F4 is the focal length of the fourth lens group; D1T is the distance between the first lens group and the second lens group at the telephoto edge; and D3T is the distance between the third lens group and the fourth lens group at the telephoto edge.

$$0.5 \leq D3T/-F4 \leq 3.0 \quad (5)$$

$$3.5 \leq (D3T \times D1T)/(F2 \times F4) \leq 15 \quad (6)$$

Conditional expression (5) prescribes a condition for reducing the diameter and the overall length of the optical system without hindering the achievement of a high zoom ratio.

Below the lower limit of conditional expression (5), the interval between the third lens group and the fourth lens group at the telephoto edge becomes too wide and the overall length of the optical system increases. Further, the diameter of lens groups subsequent to the fourth lens group toward the image plane increases. Meanwhile, above the upper limit of conditional expression (5), the interval between third lens group and the fourth lens group at the telephoto edge becomes too narrow, hindering the achievement of a high zoom ratio. Further, the power of the fourth lens group becomes too weak and the overall length of the optical system at the telephoto edge increases. In either case, implementation of a compact zoom lens having a high zoom ratio becomes difficult.

By satisfying conditional expression (5) within the following range, even more favorable effects can be expected.

$$0.65 \leq D3T/-F4 \leq 2.0 \quad (5a)$$

By satisfying the range prescribed by conditional expression (5a), reductions in the diameter and overall length of the optical system are facilitated, enabling an even more compact optical system.

By satisfying conditional expression (5a) within the following range, yet even more favorable effects can be expected.

$$0.80 \leq D3T/-F4 \leq 1.5 \quad (5b)$$

By satisfying the range prescribed by conditional expression (5b), further reductions in the diameter and the overall length of the optical system are facilitated, enabling an even more compact optical system to be achieved.

Conditional expression (6) prescribes a condition for achieving a zoom lens that has a high zoom ratio and that is compact. Typically, when a high zoom ratio is attempted for a zoom lens, the distance that the lens group controlling zooming is moved increases and consequently, the overall length of the optical system increases, making a compact size of the optical system difficult. However, by satisfying conditional expression (6), the distance that the lens group controlling zooming is moved can be suppressed while enabling a reduction of the overall length of the optical system and a high zoom ratio.

Below the lower limit of conditional expression (6), the power of the second lens group and of the fourth lens group becomes too weak, and if a high zoom ratio is attempted to be achieved, the second lens group and the fourth lens group have to be moved a large distance when zooming is performed. Consequently, a high zoom ratio and a compact size for the zoom lens become difficult to achieve. Meanwhile, above the upper limit of conditional expression (6), the interval between the first lens group and the second lens group, and the interval between the third lens group and the fourth lens group become too large at the telephoto edge, causing the overall length of the optical system to increase, hindering achievement of a compact size for the optical system.

By satisfying conditional expression (6) within the following range, even more favorable effects can be expected.

$$4.5 \leq (D3T \times D1T)/(F2 \times F4) \leq 12 \quad (6a)$$

By satisfying the range prescribed by conditional expression (6a), the overall length of the optical system can be reduced further while enabling a high zoom ratio.

By satisfying conditional expression (6a) within the following range, yet even more favorable effects can be expected.

$$5.5 \leq (D3T \times D1T)/(F2 \times F4) \leq 10 \quad (6b)$$

By satisfying the range prescribed by conditional expression (6b), the overall length of the optical system can be reduced even further while enabling a high zoom ratio to be achieved.

As described, the zoom lens according to the present invention has the configuration described above, enabling a compact zoom lens that achieves wide angles and has a high zoom ratio to be implemented while further having a favorable anti-shake correction function. In particular, by satisfying the conditions described above, a compact size, wide angles, and a high zoom ratio are achieved while enabling imaging performance to be improved. Further, the distance that the anti-shake group is shifted at the time of image blur correction is suppressed and imaging performance is maintained during image blur correction.

With reference to the accompanying drawings embodiments of the zoom lens according to the present invention will be described in detail.

FIG. 1 is a cross sectional view along the optical axis, depicting a configuration of the zoom lens according to a first embodiment. The zoom lens includes sequentially from an object side that is nearest an object (not depicted), a first lens group $G_{11}$ having a positive refractive power, a second lens group $G_{12}$ having a negative refractive power, a third lens group $G_{13}$ having a positive refractive power, a fourth lens group $G_{14}$ having a negative refractive power, a fifth lens group $G_{15}$ having a positive refractive power, a sixth lens group $G_{16}$ having a negative refractive power. Further, between the second lens group $G_{12}$ and the third lens group $G_{13}$, an aperture stop S that prescribes a given diameter is disposed.

The first lens group $G_{11}$ includes sequentially from the object side, a negative lens $L_{111}$, a positive lens $L_{112}$, and a positive lens $L_{113}$. The negative lens $L_{111}$ and the positive lens $L_{112}$ are cemented.

The second lens group $G_{12}$ includes sequentially from the object side, a negative lens $L_{121}$, a negative lens $L_{122}$, a positive lens $L_{123}$, and a negative lens $L_{124}$. The negative lens $L_{122}$ and the positive lens $L_{123}$ are cemented. Further, both surfaces of the negative lens $L_{124}$ are aspheric.

The third lens group $G_{13}$ includes sequentially from the object side, a positive lens $L_{131}$, a negative lens $L_{132}$, and a positive lens $L_{133}$. The positive lens $L_{131}$ and the negative lens $L_{132}$ are cemented. Further, both surfaces of the positive lens $L_{133}$ are aspheric.

The fourth lens group $G_{14}$ includes sequentially from the object side, a negative lens $L_{141}$ and a positive lens $L_{142}$. The negative lens $L_{141}$ and positive lens $L_{142}$ are cemented.

The fifth lens group $G_{15}$ includes sequentially from the object side, a positive lens $L_{151}$ and a negative lens $L_{152}$. On the positive lens $L_{151}$, the surface facing toward the object is aspheric. The positive lens $L_{151}$ and the negative lens $L_{152}$ are cemented.

The sixth lens group $G_{16}$ is formed by a negative lens $L_{161}$.

The zoom lens moves the first lens group $G_{11}$ along the optical axis, from the image plane side to the object side; moves the second lens group $G_{12}$ along the optical axis, from the object side to the image plane side; moves the third lens group $G_{13}$ along the optical axis, from the image plane side to the object side; moves the fourth lens group $G_{14}$ along the optical axis, from the object side to the image plane side; and moves the fifth lens group $G_{15}$ along the optical axis, from the object side and back, to zoom from the wide angle edge to the telephoto edge.

The zoom lens moves the fifth lens group $G_{15}$ along the optical axis to perform focusing from infinity to the minimum object distance. Further, the zoom lens shifts the second lens group $G_{12}$ in a direction substantially orthogonal to the optical axis to correct image blur that occurs with optical system vibration consequent to hand-shake.

Various values related to the zoom lens according to the first embodiment are indicated below.

Focal length of entire zoom lens = 4.7885 (wide angle edge) to 43.0115 (intermediate position) to 186.8884 (Ft: telephoto edge)
F number (Fno.) = 2.9 (wide angle edge) to 4.9 (intermediate position) to 6.4 (telephoto edge)
Half-angle ($\omega$) = 41.39 ($\omega$w: wide angle edge) to 5.09 (intermediate position) to 1.17 (telephoto edge)
Paraxial image height (Y) = 4.22 (Ymax: wide angle edge) to 3.83 (intermediate position) to 3.83 (telephoto edge)
Focal length (F1) of first lens group $G_{11}$ = 76.1290
Focal length (F2) of second lens group $G_{12}$ = −8.0447
Focal length (F3) of third lens group $G_{13}$ = 16.9296
Focal length (F4) of fourth lens group $G_{14}$ = −26.5386
Focal length of fifth lens group $G_{15}$ = 19.5036
Focal length of sixth lens group $G_{16}$ = −60.5779
Zoom ratio (Z) = 39.0244

(Lens Data)

| | | | |
|---|---|---|---|
| $r_1$ = 104.6796 | $d_1$ = 0.9000 | $nd_1$ = 1.80610 | $\upsilon d_1$ = 33.27 |
| $r_2$ = 48.4361 | $d_2$ = 4.5000 | $nd_2$ = 1.43700 | $\upsilon d_2$ = 95.10 |
| $r_3$ = −183.2004 | $d_3$ = 0.2000 | | |
| $r_4$ = 43.2099 | $d_4$ = 3.0000 | $nd_3$ = 1.61800 | $\upsilon d_3$ = 63.39 |
| $r_5$ = 166.2488 | $d_5$ = D(5) (variable) | | |
| $r_6$ = 125.5141 | $d_6$ = 0.5000 | $nd_4$ = 1.69680 | $\upsilon d_4$ = 55.46 |
| $r_7$ = 8.2265 | $d_7$ = 3.9590 | | |
| $r_8$ = −32.1614 | $d_8$ = 0.5000 | $nd_5$ = 1.91082 | $\upsilon d_5$ = 35.25 |
| $r_9$ = 23.1845 | $d_9$ = 2.3344 | $nd_6$ = 1.94595 | $\upsilon d_6$ = 17.98 |
| $r_{10}$ = −39.9024 | $d_{10}$ = 1.3656 | | |
| $r_{11}$ = −14.2642 (aspheric surface) | $d_{11}$ = 0.5000 | $nd_7$ = 1.83441 | $\upsilon d_7$ = 37.28 |
| $r_{12}$ = −28.6551 (aspheric surface) | $d_{12}$ = D(12) (variable) | | |
| $r_{13}$ = ∞ (aperture stop) | $d_{13}$ = 0.4000 | | |
| $r_{14}$ = 27.1942 | $d_{14}$ = 2.5640 | $nd_8$ = 1.61800 | $\upsilon d_8$ = 63.39 |
| $r_{15}$ = −9.3597 | $d_{15}$ = 0.5000 | $nd_9$ = 1.74950 | $\upsilon d_9$ = 35.04 |
| $r_{16}$ = −58.6359 | $d_{16}$ = 2.3973 | | |
| $r_{17}$ = 62.5307 (aspheric surface) | $d_{17}$ = 2.4432 | $nd_{10}$ = 1.49710 | $\upsilon d_{10}$ = 81.56 |
| $r_{18}$ = −14.1291 (aspheric surface) | $d_{18}$ = D(18) (variable) | | |
| $r_{19}$ = −36.2539 | $d_{19}$ = 0.6000 | $nd_{11}$ = 1.74400 | $\upsilon d_{11}$ = 44.90 |
| $r_{20}$ = 10.2432 | $d_{20}$ = 1.7000 | $nd_{12}$ = 1.84666 | $\upsilon d_{12}$ = 23.78 |
| $r_{21}$ = 31.5852 | $d_{21}$ = D(21) (variable) | | |
| $r_{22}$ = 22.3669 (aspheric surface) | $d_{22}$ = 3.5000 | $nd_{13}$ = 1.49710 | $\upsilon d_{13}$ = 81.56 |
| $r_{23}$ = −8.8079 | $d_{23}$ = 0.7000 | $nd_{14}$ = 1.84666 | $\upsilon d_{14}$ = 23.78 |
| $r_{24}$ = −12.1131 | $d_{24}$ = D(24) (variable) | | |
| $r_{25}$ = −15.0000 | $d_{25}$ = 0.7000 | $nd_{15}$ = 1.84666 | $\upsilon d_{15}$ = 23.78 |
| $r_{26}$ = −21.6538 | $d_{26}$ = D(26) (variable) | | |
| $r_{27}$ = ∞ (image plane) | | | |

Constant of cone (k) and Aspheric coefficients (A, B, C, D, E, F)

(eleventh plane)

k = 1.0000,
A = 0, B = 1.45339 × 10$^{-4}$,
C = −6.22182 × 10$^{-6}$, D = 4.06493 × 10$^{-8}$,
E = 6.50599 × 10$^{-10}$, F = −6.52539 × 10$^{-12}$ (twelfth plane)

k = 1.0000,
A = 0, B = 8.14642 × 10$^{-5}$,
C = −6.44794 × 10$^{-6}$, D = 6.78926 × 10$^{-8}$,
E = 0, F = 0

(seventeenth plane)

k = 1.0000,
A = 0, B = −1.75747 × 10$^{-4}$,
C = 5.53527 × 10$^{-6}$, D = −2.97994 × 10$^{-7}$,
E = 3.72276 × 10$^{-9}$, F = 0

-continued (eighteenth plane)

k = 1.0000,
A = 0, B = −7.65925 × 10⁻⁵,
C = 4.63905 × 10⁻⁶, D = −2.43393 × 10⁻⁷,
E = 2.79005 × 10⁻⁹, F = 0
(twenty-second plane)

k = 1.0000,
A = 0, B = −8.33779 × 10⁻⁵,
C = 7.43779 × 10⁻⁷, D = −3.17595 × 10⁻⁸,
E = 5.00716 × 10⁻¹⁰, F = 0

(Zoom Data)

|       | wide angle | intermediate position | telephoto |
|-------|------------|----------------------|-----------|
| D(5)  | 0.8000     | 40.5304              | 55.9335   |
| D(12) | 34.7488    | 8.3490               | 0.1000    |
| D(18) | 2.3744     | 21.7219              | 30.8851   |
| D(21) | 11.0458    | 8.8163               | 10.6225   |
| D(24) | 7.1741     | 4.5967               | 2.1000    |
| D(26) | 7.0917     | 7.1141               | 7.1503    |

Interval (D2W) between second lens group $G_{12}$ and
  third lens group $G_{13}$ at wide angle edge=35.1488
  tan(ωw)=0.8819D2W×(−F2)/
  (Ft×tan(ωw))=
  1.7155           (Values Related to Conditional Expression (1))

(F1×Ft)/(−F2×F3)=
  104.4660         (Values Related to Conditional Expression (2))

Anti-shake coefficient (BXt2) for second lens group
  $G_{12}$ overall at telephoto edge=4.8296BXt2×tan
  (ωw)=4.2594     (Values Related to Conditional Expression (3))

(Z×Ymax)/(−F2)=
  20.4885          (Values Related to Conditional Expression (4))

Distance (D3T) between third lens group $G_{13}$ and
  fourth lens group $G_{14}$ at telephoto edge=
  30.8851D3T/
  −F4=1.1638       (Values Related to Conditional Expression (5))

Distance (D1T) between first lens group $G_{11}$ and
  second lens
  group $G_{12}$ at
  telephoto edge=
  55.9335          (Values Related to Conditional Expression (6))

(D3T×D1T)/(F2×F4)=8.0916

Figure 2:
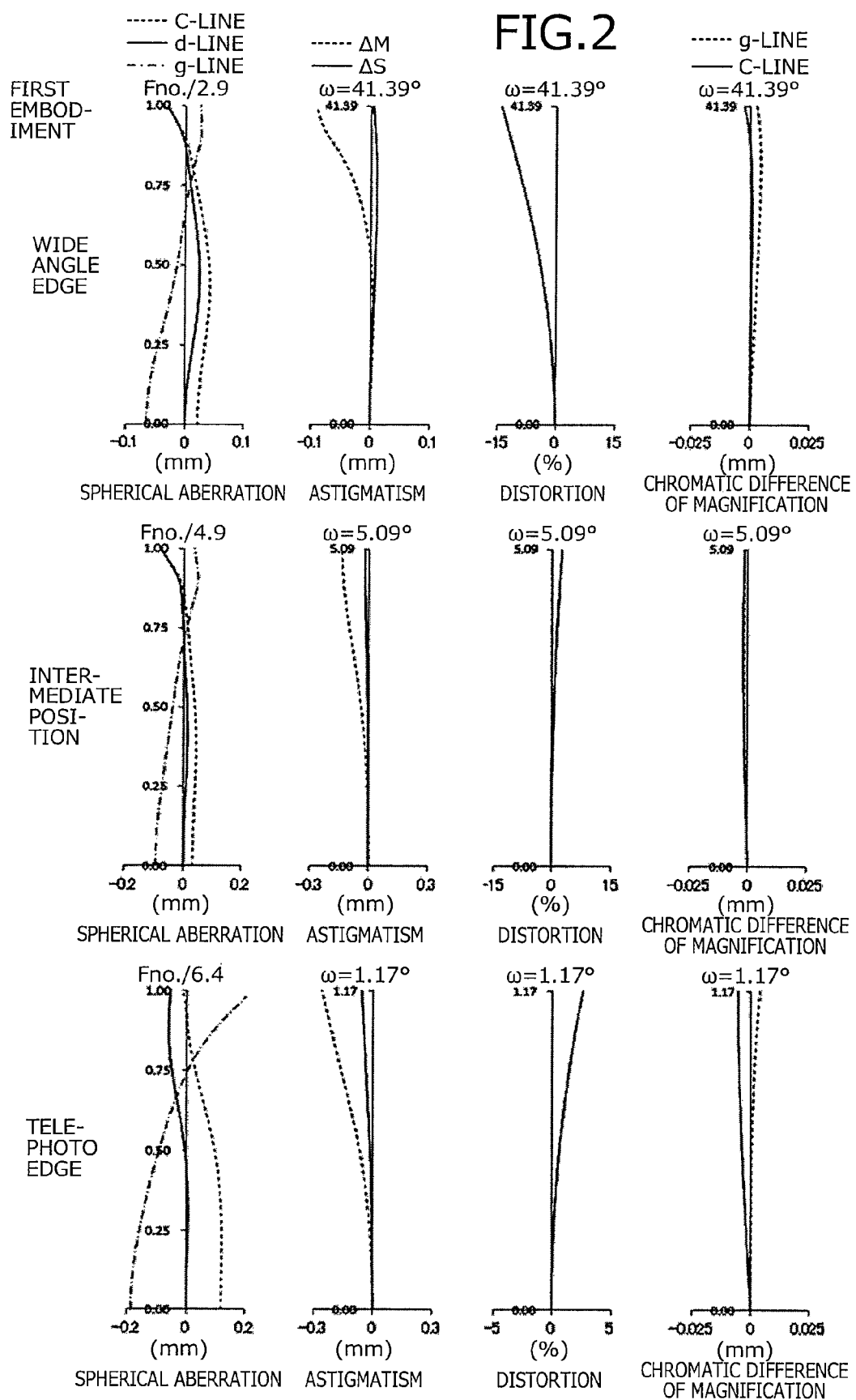
FIG. 2 is a diagram of various types of aberration in the zoom lens according to the first embodiment.

FIG. 2 is a diagram of various types of aberration in the zoom lens according to the first embodiment. Wavelength aberration corresponding to g-line (λ=435.83 nm), d-line (λ=587.56 nm), and C-line (λ=656.28 nm) is depicted. ΔS and ΔM in a portion depicting astigmatism, indicate aberration with respect to a sagittal image plane and a meridional image plane, respectively.

Figure 3:
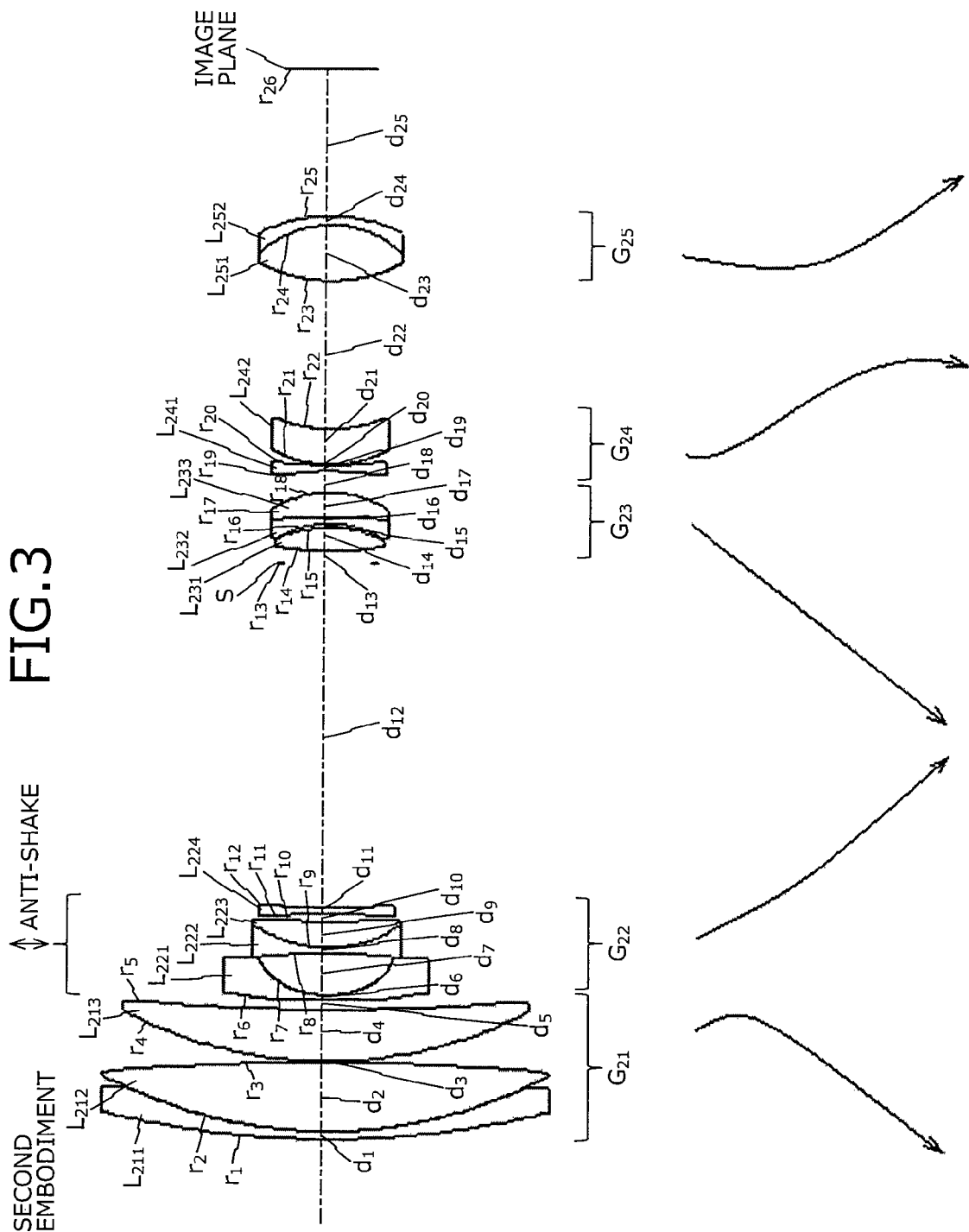
FIG. 3 is a cross sectional view along the optical axis, depicting a configuration of the zoom lens according to a second embodiment.

FIG. 3 is a cross sectional view along the optical axis, depicting a configuration of the zoom lens according to a second embodiment. The zoom lens includes sequentially from the object side, a first lens group $G_{21}$ having a positive refractive power, a second lens group $G_{22}$ having a negative refractive power, a third lens group $G_{23}$ having a positive refractive power, a fourth lens group $G_{24}$ having a negative refractive power, and a fifth lens group $G_{25}$ having a positive refractive power. Further, between the second lens group $G_{22}$ and the third lens group $G_{23}$, the aperture stop S that prescribes a given diameter is disposed.

The first lens group $G_{21}$ includes sequentially from the object side, a negative lens $L_{211}$, a positive lens $L_{212}$, and a positive lens $L_{213}$. The negative lens $L_{211}$ and the positive lens $L_{212}$ are cemented.

The second lens group $G_{22}$ includes sequentially from the object side, a negative lens $L_{221}$, a negative lens $L_{222}$, a positive lens $L_{223}$, and a negative lens $L_{224}$. Both surfaces of the negative lens $L_{221}$ and the surface on the negative lens $L_{224}$, facing toward the image plane are aspheric. The negative lens $L_{222}$ and the positive lens $L_{223}$ are cemented.

The third lens group $G_{23}$ includes sequentially from the object side, a positive lens $L_{231}$, a negative lens $L_{232}$, and a positive lens $L_{233}$. On the positive lens $L_{231}$, the surface facing toward the object is aspheric. The negative lens $L_{232}$ and the positive lens $L_{233}$ are aspheric.

The fourth lens group $G_{24}$ includes sequentially from the object side, a negative lens $L_{241}$ and a positive lens $L_{242}$. Both surfaces of the positive lens $L_{242}$ are aspheric.

The fifth lens group $G_{25}$ includes sequentially from the object side, a positive lens $L_{251}$ and a negative lens $L_{252}$. On the positive lens $L_{251}$, the surface facing toward the object is aspheric. The positive lens $L_{251}$ and the negative lens $L_{252}$ are cemented.

The zoom lens moves the first lens group $G_{21}$ along the optical axis, from the image plane side to the object side; moves the second lens group $G_{22}$ along the optical axis, from the object side to the image plane side; moves the third lens group $G_{23}$ along the optical axis, from the image plane side to the object side; moves the fourth lens group $G_{24}$ along the optical axis, from the object side to the image plane side; and moves the fifth lens group $G_{25}$ along the optical axis, from the object side and back, to zoom from the wide angle edge to the telephoto edge.

The zoom lens moves the fifth lens group $G_{25}$ along the optical axis to perform focusing from infinity to the minimum object distance. Further, the zoom lens shifts the second lens group $G_{22}$ in a direction substantially orthogonal to the optical axis to correct image blur that occurs with optical system vibration consequent to hand-shake.

Various values related to the zoom lens according to the second embodiment are indicated below.

Focal length of entire zoom lens = 4.6042 (wide angle
  edge) to 29.0000 (intermediate position) to 183.6480 (Ft:
  telephoto edge)
F number (F no.) = 2.9 (wide angle edge) to 4.1 (intermediate
  position) to 6.0 (telephoto edge)
Half-angle (ω) = 42.83 (ωw: wide angle edge) to
  3.92 (intermediate position) to 1.20 (telephoto edge)
Paraxial image height (Y) = 4.27 (Ymax: wide angle edge) to
  3.92 (intermediate position) to 3.85 (telephoto edge)
Focal length (F1) of first lens group $G_{21}$ = 69.2539
Focal length (F2) of second lens group $G_{22}$ = −7.0524
Focal length (F3) of third lens group $G_{23}$ = 16.4363
Focal length (F4) of fourth lens group $G_{24}$ = −28.2916
Focal length of fifth lens group $G_{25}$ = 19.6612
Zoom ratio (Z) = 39.8870

(Lens Data)

| | | | |
|---|---|---|---|
| $r_1$ = 86.8572 | $d_1$ = 0.7000 | $nd_1$ = 1.80610 | $vd_1$ = 33.27 |
| $r_2$ = 43.6362 | $d_2$ = 6.2000 | $nd_2$ = 1.43700 | $vd_2$ = 95.10 |
| $r_3$ = −236.7447 | $d_3$ = 0.1000 | | |
| $r_4$ = 40.2773 | $d_4$ = 4.6000 | $nd_3$ = 1.59282 | $vd_3$ = 68.62 |
| $r_5$ = 195.8458 | $d_5$ = D(5) (variable) | | |
| $r_6$ = 800.0000 (aspheric surface) | $d_6$ = 0.5000 | $nd_4$ = 1.69350 | $vd_4$ = 53.20 |
| $r_7$ = 10.0625 (aspheric surface) | $d_7$ = 3.7212 | | |

-continued

| | | | |
|---|---|---|---|
| $r_8 = -61.9805$ | $d_8 = 0.5000$ | $nd_5 = 1.88100$ | $vd_5 = 40.14$ |
| $r_9 = 11.7228$ | $d_9 = 2.3603$ | $nd_6 = 1.94595$ | $vd_6 = 17.98$ |
| $r_{10} = 102.9725$ | $d_{10} = 0.6542$ | | |
| $r_{11} = -76.9383$ | $d_{11} = 0.5000$ | $nd_7 = 1.88202$ | $vd_7 = 37.22$ |
| $r_{12} = 37.8481$ (aspheric surface) | $d_{12} = D(12)$ (variable) | | |
| $r_{13} = \infty$ (aperture stop) | $d_{13} = 1.0000$ | | |
| $r_{14} = 25.1003$ (aspheric surface) | $d_{14} = 2.1400$ | $nd_8 = 1.61881$ | $vd_8 = 63.85$ |
| $r_{15} = -11.2849$ | $d_{15} = 0.3776$ | | |
| $r_{16} = -9.0000$ | $d_{16} = 0.5000$ | $nd_9 = 1.61293$ | $vd_9 = 36.96$ |
| $r_{17} = -118.8368$ | $d_{17} = 2.3053$ | $nd_{10} = 1.49700$ | $vd_{10} = 81.61$ |
| $r_{18} = -9.8194$ | $d_{18} = D(18)$ (variable) | | |
| $r_{19} = -28.8403$ | $d_{19} = 0.5000$ | $nd_{11} = 1.80420$ | $vd_{11} = 46.50$ |
| $r_{20} = 38.6708$ | $d_{20} = 0.1000$ | | |
| $r_{21} = 12.1139$ (aspheric surface) | $d_{21} = 3.2122$ | $nd_{12} = 1.84681$ | $vd_{12} = 23.62$ |
| $r_{22} = 15.0000$ (aspheric surface) | $d_{22} = D(22)$ (variable) | | |
| $r_{23} = 13.6781$ (aspheric surface) | $d_{23} = 5.0000$ | $nd_{13} = 1.49700$ | $vd_{13} = 81.61$ |
| $r_{24} = -9.6526$ | $d_{24} = 0.8000$ | $nd_{14} = 1.90366$ | $vd_{14} = 31.31$ |
| $r_{25} = -15.4094$ | $d_{25} = D(25)$ (variable) | | |
| $r_{26} = \infty$ (image plane) | | | |

Constant of cone (k) and Aspheric coefficients (A, B, C, D, E, F)

(sixth plane)

k = 1.0000,
A = 0, B = 2.85233 × 10$^{-4}$,
C = −3.72392 × 10$^{-6}$, D = 3.26691 × 10$^{-8}$,
E = −3.17300 × 10$^{-10}$, F = 1.46784 × 10$^{-12}$
(seventh plane)

k = 1.0000,
A = 0, B = 4.54486 × 10$^{-4}$,
C = 7.51122 × 10$^{-7}$, D = 1.74448 × 10$^{-7}$,
E = −3.32774 × 10$^{-10}$, F = 0
(twelfth plane)

k = 1.0000,
A = 0, B = −1.26158 × 10$^{-4}$,
C = −1.22232 × 10$^{-6}$, D = −1.48733 × 10$^{-10}$,
E = −8.83503 × 10$^{-11}$, F = 2.56374 × 10$^{-11}$
(fourteenth plane)

k = 5.9757,
A = 0, B = −1.40409 × 10$^{-4}$,
C = −3.45339 × 10$^{-7}$, D = 2.12846 × 10$^{-8}$,
E = −5.77296 × 10$^{-10}$, F = 0
(twenty-first plane)

k = 1.0000,
A = 0, B = 1.42918 × 10$^{-4}$,
C = 8.28678 × 10$^{-7}$, D = 6.90896 × 10$^{-8}$,
E = −8.64331 × 10$^{-10}$, F = 0
(twenty-second plane)

k = 1.0000,
A = 0, B = 2.28550 × 10$^{-4}$,
C = 2.57220 × 10$^{-6}$, D = 1.07616 × 10$^{-7}$,
E = −3.43355 × 10$^{-11}$, F = 0
(twenty-third plane)

k = 1.0000, A = 0, B = −6.57548 × 10$^{-5}$,
C = 5.46170 × 10$^{-8}$, D = 1.30576 × 10$^{-8}$,
E = −1.49895 × 10$^{-10}$, F = 0

(Zoom Data)

| | wide angle | intermediate position | telephoto |
|---|---|---|---|
| D(5) | 0.8000 | 33.0675 | 49.9719 |
| D(12) | 31.4258 | 10.7806 | 2.1556 |
| D(18) | 1.9471 | 17.5531 | 31.4720 |
| D(22) | 13.3575 | 9.6265 | 11.2984 |
| D(25) | 7.8285 | 11.5424 | 11.5424 |

Interval ($D2W$) between second lens group $G_{22}$ and third lens group $G_{23}$ at wide angle edge=32.4258
$\tan(\omega w) = 0.9270 D2W \times (-F2)/(Ft \times \tan(\omega w)) =$
1.3432 (Values Related to Conditional Expression (1))

$(F1 \times Ft)/(-F2 \times F3) =$
109.7209 (Values Related to Conditional Expression (2))

Anti-shake coefficient ($BXt2$) for second lens group $G_{22}$ overall at telephoto edge=4.8670$BXt2 \times \tan(\omega w)$=4.5119 (Values Related to Conditional Expression (3))

$(Z \times Y\max)/(-F2) =$
24.1402 (Values Related to Conditional Expression (4))

Distance ($D3T$) between third lens group $G_{23}$ and fourth lens group $G_{24}$ at telephoto edge= 31.4720$D3T/-F4$=1.1124 (Values Related to Conditional Expression (5))

Distance ($D1T$) between first lens group $G_{21}$ and second lens group $G_{22}$ at telephoto edge=49.9719 (Values Related to Conditional Expression (6))

$(D3T \times D1T)/(F2 \times F4) = 7.8824$

Figure 4:
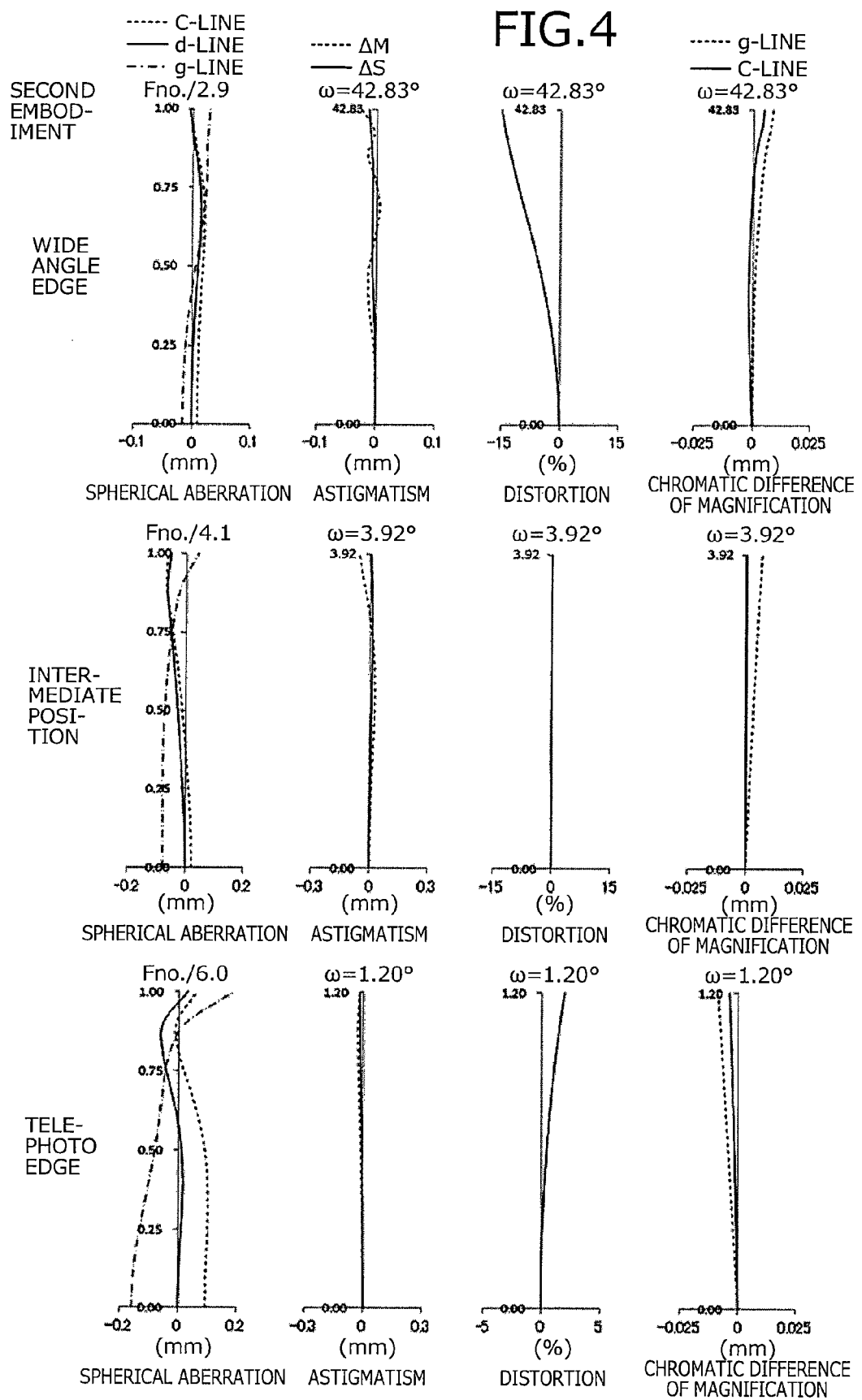
FIG. 4 is a diagram of various types of aberration in the zoom lens according to the second embodiment.

FIG. 4 is a diagram of various types of aberration in the zoom lens according to the second embodiment. Wavelength aberration corresponding to g-line ($\lambda$=435.83 nm), d-line ($\lambda$=587.56 nm), and C-line ($\lambda$=656.28 nm) is depicted. ΔS and ΔM in a portion depicting astigmatism, indicate aberration with respect to a sagittal image plane and a meridional image plane, respectively.

Figure 5:
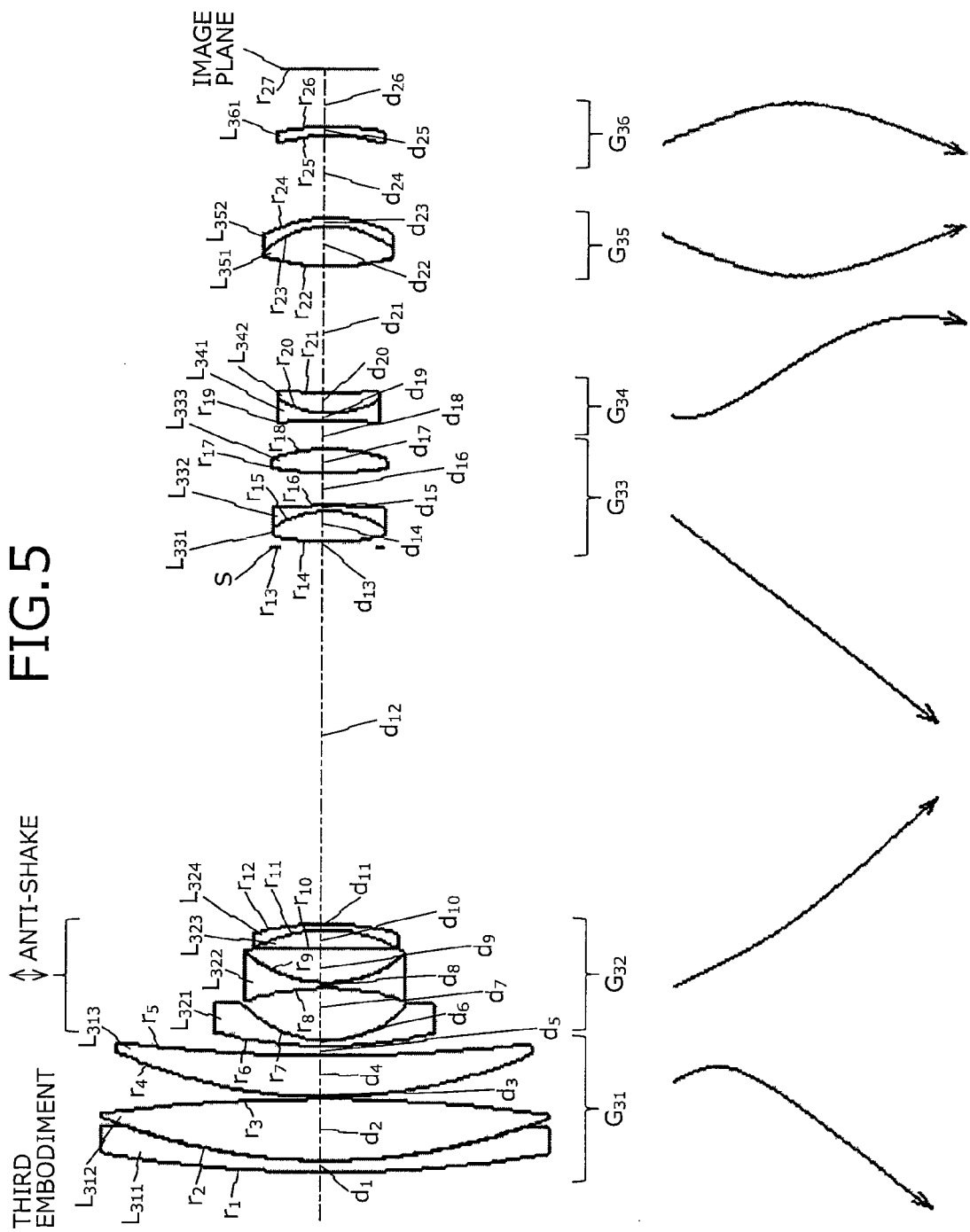
FIG. 5 is a cross sectional view along the optical axis, depicting a configuration of the zoom lens according to a third embodiment.

FIG. 5 is a cross sectional view along the optical axis, depicting a configuration of the zoom lens according to a third embodiment. The zoom lens includes sequentially from the object side, a first lens group $G_{31}$ having a positive refractive power, a second lens group $G_{32}$ having a negative refractive power, a third lens group $G_{33}$ having a positive refractive power, a fourth lens group $G_{34}$ having a negative refractive power, a fifth lens group $G_{35}$ having a positive refractive power, and a sixth lens group $G_{36}$ having a negative refractive power. Further, between the second lens group $G_{32}$ and the third lens group $G_{33}$, the aperture stop S that prescribes a given diameter is disposed.

The first lens group $G_{31}$ includes sequentially from the object side, a negative lens $L_{311}$, a positive lens $L_{312}$, and a positive lens $L_{313}$. The negative lens $L_{311}$ and the positive lens $L_{312}$ are cemented.

The second lens group $G_{32}$ includes sequentially from the object side, a negative lens $L_{321}$, a negative lens $L_{322}$, a positive lens $L_{323}$, and a negative lens $L_{324}$. The negative lens $L_{322}$ and the positive lens $L_{323}$ are cemented.

The third lens group $G_{33}$ includes sequentially from the object side, a positive lens $L_{331}$, a negative lens $L_{332}$, and a positive lens $L_{333}$. The positive lens $L_{331}$ and the negative lens $L_{332}$ are cemented. Further, both surfaces of the positive lens $L_{333}$ are aspheric.

The fourth lens group $G_{34}$ includes sequentially from the object side, a negative lens $L_{341}$ and a positive lens $L_{342}$. The negative lens $L_{341}$ and the positive lens $L_{342}$ are cemented.

The fifth lens group $G_{35}$ includes sequentially from the object side, a positive lens $L_{351}$ and a negative lens $L_{352}$. On the positive lens $L_{351}$, the surface facing toward the object is aspheric. The positive lens $L_{351}$ and the negative lens $L_{352}$ are cemented.

The sixth lens group $G_{36}$ is formed by a negative lens $L_{361}$.

The zoom lens moves the first lens group $G_{31}$ along the optical axis, from the image plane side to the object side; moves the second lens group $G_{32}$ along the optical axis, from the object side to the image plane side; moves the third lens group $G_{33}$ along the optical axis, from the image plane side to the object side; moves the fourth lens group $G_{34}$ along the optical axis, from the object side to the image plane side; and moves the fifth lens group $G_{35}$ along the optical axis, from the object side and back, to zoom from the wide angle edge to the telephoto edge.

The zoom lens moves the fifth lens group $G_{35}$ along the optical axis to perform focusing from infinity to the minimum object distance. Further, the zoom lens shifts the second lens group $G_{32}$ in a direction substantially orthogonal to the optical axis to correct image blur that occurs with optical system vibration consequent to hand-shake.

Various values related to the zoom lens according to the third embodiment are indicated below.

---

Focal length of entire zoom lens = 4.7887 (wide angle edge) to 45.032 (intermediate position) to 204.6109 (Ft: telephoto edge)
F number (F no.) = 2.9 (wide angle edge) to 5.2 (intermediate position) to 6.5 (telephoto edge)
Half-angle (ω) = 41.70 (ωw: wide angle edge) to 4.81 (intermediate position) to 1.06 (telephoto edge)
Paraxial image height (Y) = 4.27 (Ymax: wide angle edge) to 3.79 (intermediate position) to 3.79 (telephoto edge)
Focal length (F1) of first lens group $G_{31}$ = 80.2143
Focal length (F2) of second lens group $G_{32}$ = −7.4858
Focal length (F3) of third lens group $G_{33}$ = 15.4591
Focal length (F4) of fourth lens group $G_{34}$ = −23.2278
Focal length of fifth lens group $G_{35}$ = 18.7207
Focal length of sixth lens group $G_{36}$ = −41.4617
Zoom ratio (Z) = 42.7252

---

(Lens Data)

| | | | |
|---|---|---|---|
| $r_1$ = 118.7286 | $d_1$ = 1.0000 | $nd_1$ = 1.80610 | $vd_1$ = 33.27 |
| $r_2$ = 52.6232 | $d_2$ = 5.3000 | $nd_2$ = 1.43700 | $vd_2$ = 95.10 |
| $r_3$ = −148.5460 | $d_3$ = 0.2000 | | |
| $r_4$ = 45.0241 | $d_4$ = 3.6000 | $nd_3$ = 1.61800 | $vd_3$ = 63.39 |
| $r_5$ = 150.3707 | $d_5$ = D(5) (variable) | | |
| $r_6$ = 40.5889 | $d_6$ = 0.5000 | $nd_4$ = 1.69680 | $vd_4$ = 55.46 |
| $r_7$ = 10.0218 | $d_7$ = 4.4700 | | |
| $r_8$ = −23.9466 | $d_8$ = 0.5000 | $nd_5$ = 1.91082 | $vd_5$ = 35.25 |
| $r_9$ = 11.0000 | $d_9$ = 2.9736 | $nd_6$ = 1.94595 | $vd_6$ = 17.98 |
| $r_{10}$ = −183.9563 | $d_{10}$ = 1.5404 | | |
| $r_{11}$ = −13.5647 | $d_{11}$ = 0.5000 | $nd_7$ = 1.90366 | $vd_7$ = 31.31 |
| $r_{12}$ = −25.5276 | $d_{12}$ = D(12) (variable) | | |
| $r_{13}$ = ∞ (aperture stop) | $d_{13}$ = 0.4000 | | |
| $r_{14}$ = 22.2366 | $d_{14}$ = 2.6574 | $nd_8$ = 1.61800 | $vd_8$ = 63.39 |
| $r_{15}$ = −9.1559 | $d_{15}$ = 0.5000 | $nd_9$ = 1.74950 | $vd_9$ = 35.04 |
| $r_{16}$ = −111.4891 | $d_{16}$ = 2.8840 | | |
| $r_{17}$ = 29.5535 (aspheric surface) | $d_{17}$ = 2.0717 | $nd_{10}$ = 1.49710 | $vd_{10}$ = 81.56 |
| $r_{18}$ = −14.3273 (aspheric surface) | $d_{18}$ = D(18) (variable) | | |
| $r_{19}$ = −44.1928 | $d_{19}$ = 0.6000 | $nd_{11}$ = 1.74400 | $vd_{11}$ = 44.90 |
| $r_{20}$ = 8.2752 | $d_{20}$ = 1.7000 | $nd_{12}$ = 1.84666 | $vd_{12}$ = 23.78 |
| $r_{21}$ = 22.0953 | $d_{21}$ = D(21) (variable) | | |
| $r_{22}$ = 18.4314 (aspheric surface) | $d_{22}$ = 3.5000 | $nd_{13}$ = 1.49710 | $vd_{13}$ = 81.56 |
| $r_{23}$ = −8.8357 | $d_{23}$ = 0.7000 | $nd_{14}$ = 1.84666 | $vd_{14}$ = 23.78 |
| $r_{24}$ = −12.5408 | $d_{24}$ = D(24) (variable) | | |
| $r_{25}$ = −15.0000 | $d_{25}$ = 0.7000 | $nd_{15}$ = 1.84666 | $vd_{15}$ = 23.78 |
| $r_{26}$ = −26.7521 | $d_{26}$ = D(26) (variable) | | |
| $r_{27}$ = ∞ (image plane) | | | |

---

Constant of cone (k) and Aspheric coefficients (A, B, C, D, E, F)

(seventeenth plane)

k = 1.0000,
A = 0, B = −1.01511 × 10$^{-4}$,
C = 3.78727 × 10$^{-6}$, D = −1.96610 × 10$^{-7}$,
E = 4.41959 × 10$^{-9}$, F = 0
(eighteenth plane)

k = 1.0000,
A = 0, B = 2.11066 × 10$^{-5}$,
C = 2.99520 × 10$^{-6}$, D = −1.57582 × 10$^{-7}$,
E = 3.61863 × 10$^{-9}$, F = 0
(twenty-second plane)

k = 1.0000,
A = 0, B = −8.11343 × 10$^{-5}$,
C = 4.92638 × 10$^{-7}$, D = −1.99687 × 10$^{-8}$,
E = 3.40661 × 10$^{-10}$, F = 0

---

(Zoom Data)

| | wide angle | intermediate position | telephoto |
|---|---|---|---|
| D(5) | 0.8000 | 42.9524 | 59.3239 |
| D(12) | 33.0122 | 7.7431 | 0.1000 |
| D(18) | 2.4917 | 19.5447 | 25.5895 |
| D(21) | 11.0485 | 9.4848 | 11.5894 |
| D(24) | 7.1712 | 4.1811 | 2.1000 |
| D(26) | 5.0039 | 5.0246 | 5.0366 |

Interval (D2W) between second lens group $G_{32}$ and
third lens group $G_{33}$ at wide angle edge=33.4122
tan(ωw)=0.8909D2W×(−F2)/
(Ft×tan(ωw))=
1.3722 (Values Related to Conditional Expression (1))

(F1×Ft)/(−F2×F3)=
141.8268 (Values Related to Conditional Expression (2))

Anti-shake coefficient (BXt2) for second lens group
$G_{32}$ overall at telephoto edge=4.9762BXt2×tan
(ωw)=4.4331 (Values Related to Conditional Expression (3))

(Z×Ymax)/(−F2)=
24.3503 (Values Related to Conditional Expression (4))

Distance (D3T) between third lens group $G_{33}$ and
fourth lens group $G_{34}$ at telephoto edge=
25.5895D3T/
−F4=1.1017 (Values Related to Conditional Expression (5))

Distance (D1T) between first lens group $G_{31}$ and second lens
group $G_{32}$ at
telephoto edge=
59.3239 (Values Related to Conditional Expression (6))

(D3T×D1T)/(F2×F4)=8.7306

Figure 6:
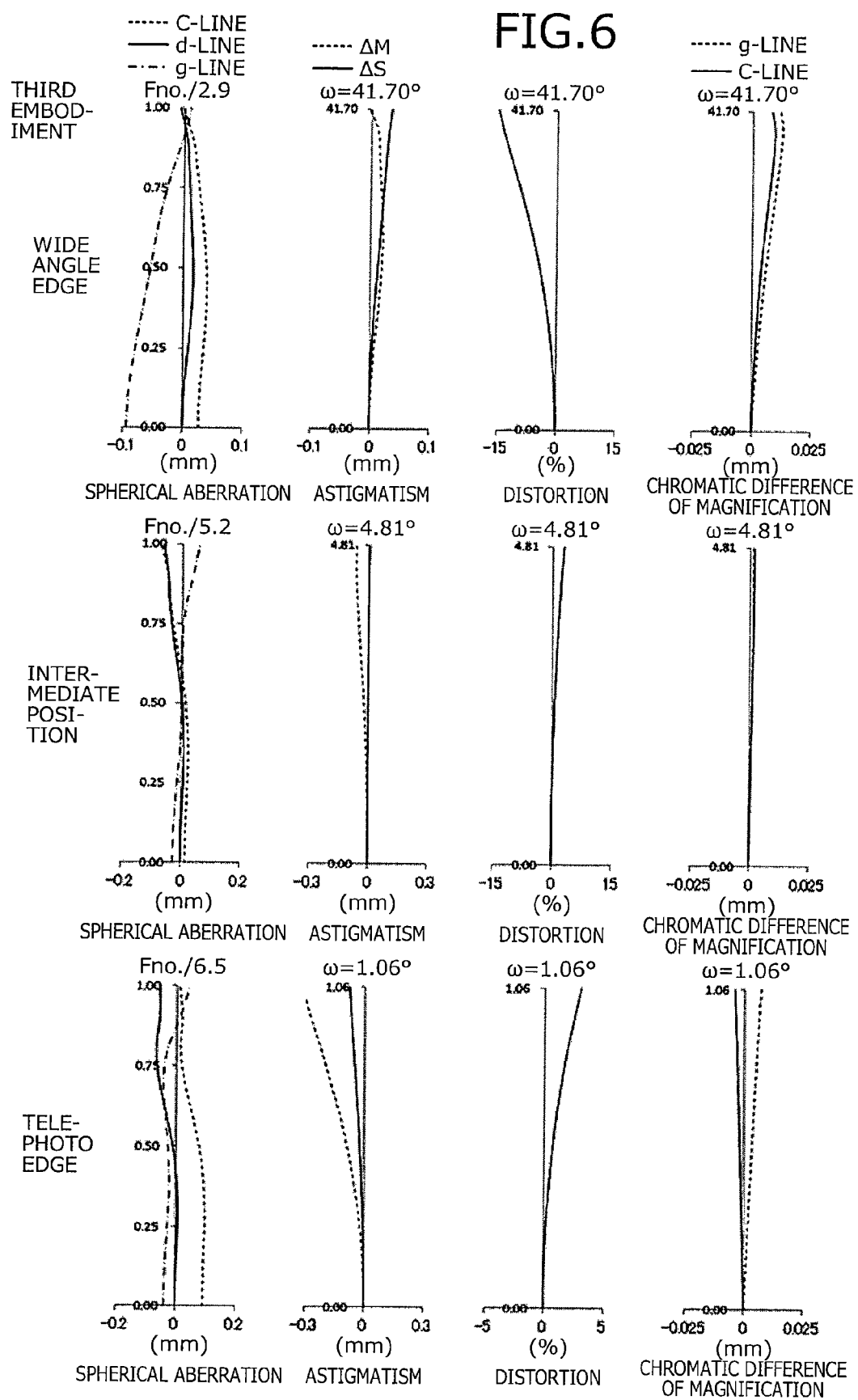
FIG. 6 is a diagram of various types of aberration in the zoom lens according to the third embodiment.

FIG. 6 is a diagram of various types of aberration in the zoom lens according to the third embodiment. Wavelength aberration corresponding to g-line (λ=435.83 nm), d-line (λ=587.56 nm), and C-line (λ=656.28 nm) is depicted. ΔS and ΔM in a portion depicting astigmatism, indicate aberration with respect to a sagittal image plane and a meridional image plane, respectively.

FIG. 7 is a cross sectional view along the optical axis, depicting a configuration of the zoom lens according to a fourth embodiment. The zoom lens includes sequentially from the object side, a first lens group $G_{41}$ having a positive refractive power, a second lens group $G_{42}$ having a negative refractive power, a third lens group $G_{43}$ having a positive refractive power, a fourth lens group $G_{44}$ having a negative refractive power, a fifth lens group $G_{45}$ having a positive refractive power, and a sixth lens group $G_{46}$ having a negative refractive power. Further, between the second lens group $G_{42}$ and the third lens group $G_{43}$, the aperture stop S that prescribes a given diameter is disposed.

The first lens group $G_{41}$ includes sequentially from the object side, a negative lens $L_{411}$, a positive lens $L_{412}$, and a positive lens $L_{413}$. The negative lens $L_{411}$ and the positive lens $L_{412}$ are cemented.

The second lens group $G_{42}$ includes sequentially from the object side, front group $G_{42F}$ having positive refractive power and a rear group $G_{42R}$ having negative refractive power. The front group $G_{42F}$ includes sequentially from the object side, a negative lens $L_{421}$, a negative lens $L_{422}$, and a positive lens $L_{423}$. Both surfaces of the negative lens $L_{421}$ and the surface on the negative lens $L_{422}$, facing toward the object are aspheric. The negative lens $L_{422}$ and the positive lens $L_{423}$ are cemented. The rear group $G_{42R}$ is formed by a negative lens $L_{424}$. Both surfaces of the negative lens $L_{424}$ are aspheric.

The third lens group $G_{43}$ includes sequentially from the object side, a positive lens $L_{431}$, a negative lens $L_{432}$, and a positive lens $L_{433}$. The positive lens $L_{431}$ and the negative lens $L_{432}$ are cemented. Further, both surfaces of the positive lens $L_{433}$ are aspheric.

The fourth lens group $G_{44}$ includes sequentially from the object side, a negative lens $L_{441}$ and a positive lens $L_{442}$. The negative lens $L_{441}$ and the positive lens $L_{442}$ are cemented.

The fifth lens group $G_{45}$ includes sequentially from the object side, a positive lens $L_{451}$ and a negative lens $L_{452}$. On the positive lens $L_{451}$, the surface facing toward the object is aspheric. The positive lens $L_{451}$ and the negative lens $L_{452}$ are cemented.

The sixth lens group $G_{46}$ is formed by a negative lens $L_{461}$.

The zoom lens moves the first lens group $G_{41}$ along the optical axis, from the image plane side to the object side; moves the second lens group $G_{42}$ along the optical axis, from the object side to the image plane side; moves the third lens group $G_{43}$ along the optical axis, from the image plane side to the object side; moves the fourth lens group $G_{44}$ along the optical axis, from the object side to the image plane side; and moves the fifth lens group $G_{45}$ along the optical axis, from the object side and back, to zoom from the wide angle edge to the telephoto edge.

The zoom lens moves the fifth lens group $G_{45}$ along the optical axis to perform focusing from infinity to the minimum object distance. Further, the zoom lens moves the front group $G_{42F}$ of the second lens group $G_{42}$ in a direction substantially orthogonal to the optical axis to correct image blur that occurs with optical system vibration consequent to hand-shake.

Various values related to the zoom lens according to the fourth embodiment are indicated below.

---

Focal length of entire zoom lens = 4.7549 (wide angle edge) to 29.0164 (intermediate position) to 198.539 (Ft: telephoto edge)
F number (F no.) = 2.9 (wide angle edge) to 4.5 (intermediate position) to 6.1 (telephoto edge)
Half-angle (ω) = 41.91 (ωw: wide angle edge) to 7.51 (intermediate position) to 1.10 (telephoto edge)
Paraxial image height (Y) = 4.268 (Ymax: wide angle edge) to 3.825 (intermediate position) to 3.802 (telephoto edge
Focal length (F1) of first lens group $G_{41}$ = 80.8922
Focal length (F2) of second lens group $G_{42}$ = −8.1514

-continued

Focal length (F3) of third lens group $G_{43}$ = 15.9264
Focal length (F4) of fourth lens group $G_{44}$ = −22.5499
Focal length of fifth lens group $G_{45}$ = 18.8794
Focal length of sixth lens group $G_{46}$ = −47.9414
Zoom ratio (Z) = 41.7537

(Lens Data)

| | | | |
|---|---|---|---|
| $r_1$ = 99.5194 | $d_1$ = 1.0000 | $nd_1$ = 1.80610 | $\upsilon d_1$ = 33.27 |
| $r_2$ = 50.4174 | $d_2$ = 5.6000 | $nd_2$ = 1.43700 | $\upsilon d_2$ = 95.10 |
| $r_3$ = −283.2720 | $d_3$ = 0.2000 | | |
| $r_4$ = 46.0953 | $d_4$ = 4.1000 | $nd_3$ = 1.59282 | $\upsilon d_3$ = 68.62 |
| $r_5$ = 206.4139 | $d_5$ = D(5) (variable) | | |
| $r_6$ = 28.4100 (aspheric surface) | $d_6$ = 0.5000 | $nd_4$ = 1.80139 | $\upsilon d_4$ = 45.45 |
| $r_7$ = 9.4498 (aspheric surface) | $d_7$ = 4.5520 | | |
| $r_8$ = −17.2432 (aspheric surface) | $d_8$ = 0.5000 | $nd_5$ = 1.85135 | $\upsilon d_5$ = 40.10 |
| $r_9$ = 20.0002 | $d_9$ = 2.2937 | $nd_6$ = 1.94595 | $\upsilon d_6$ = 17.98 |
| $r_{10}$ = −74.9586 | $d_{10}$ = 1.3235 | | |
| $r_{11}$ = −32.1740 (aspheric surface) | $d_{11}$ = 0.5000 | $nd_7$ = 1.72903 | $\upsilon d_7$ = 54.04 |
| $r_{12}$ = −200.0000 (aspheric surface) | $d_{12}$ = D(12) (variable) | | |
| $r_{13}$ = ∞ (aperture stop) | $d_{13}$ = 0.4000 | | |
| $r_{14}$ = 26.7974 | $d_{14}$ = 2.6066 | $nd_8$ = 1.61800 | $\upsilon d_8$ = 63.39 |
| $r_{15}$ = −9.7147 | $d_{15}$ = 0.5000 | $nd_9$ = 1.74950 | $\upsilon d_9$ = 35.04 |
| $r_{16}$ = −47.5489 | $d_{16}$ = 2.5000 | | |
| $r_{17}$ = 36.1276 (aspheric surface) | $d_{17}$ = 1.9301 | $nd_{10}$ = 1.49710 | $\upsilon d_{10}$ = 81.56 |
| $r_{18}$ = −16.6859 (aspheric surface) | $d_{18}$ = D(18) (variable) | | |
| $r_{19}$ = −35.9822 | $d_{19}$ = 0.5000 | $nd_{11}$ = 1.74330 | $\upsilon d_{11}$ = 49.22 |
| $r_{20}$ = 8.1860 | $d_{20}$ = 1.6953 | $nd_{12}$ = 1.90366 | $\upsilon d_{12}$ = 31.31 |
| $r_{21}$ = 20.9654 | $d_{21}$ = D(21) (variable) | | |
| $r_{22}$ = 17.4717 (aspheric surface) | $d_{22}$ = 4.3000 | $nd_{13}$ = 1.49710 | $\upsilon d_{13}$ = 81.56 |
| $r_{23}$ = −8.3849 | $d_{23}$ = 0.7000 | $nd_{14}$ = 1.90366 | $\upsilon d_{14}$ = 31.31 |
| $r_{24}$ = −12.0966 | $d_{24}$ = D(24) (variable) | | |
| $r_{25}$ = −17.3657 | $d_{25}$ = 0.7000 | $nd_{15}$ = 1.84666 | $\upsilon d_{15}$ = 23.78 |
| $r_{26}$ = −30.9116 | $d_{26}$ = D(26) (variable) | | |
| $r_{27}$ = ∞ (image plane) | | | |

Constant of cone (k) and Aspheric coefficients (A, B, C, D, E, F)

(sixth plane)

k = −72.6590,
A = 0, B = 1.39938 × 10⁻⁴,
C = −2.54371 × 10⁻⁶, D = 4.33966 × 10⁻⁸,
E = −4.15406 × 10⁻¹⁰, F = 1.88610 × 10⁻¹²

(seventh plane)

k = −0.5118,
A = 0, B = 3.06961 × 10⁻⁵,
C = 1.41245 × 10⁻⁵, D = −4.25273 × 10⁻⁷,
E = 1.05745 × 10⁻⁸, F = −7.85149 × 10⁻¹¹

(eighth plane)

k = 1.0000,
A = 0, B = 1.14758 × 10⁻⁴,
C = −1.42956 × 10⁻⁶, D = 1.95709 × 10⁻⁷,
E = −4.50142 × 10⁻⁹, F = 1.15154 × 10⁻¹¹

(eleventh plane)

k = 1.0000,
A = 0, B = 2.45048 × 10⁻⁴,
C = −1.43869 × 10⁻⁵, D = 4.58757 × 10⁻⁸,
E = 7.75921 × 10⁻⁹, F = −9.21631 × 10⁻¹¹

(twelfth plane)

k = 1.0000,
A = 0, B = 2.54443 × 10⁻⁴,
C = −1.71144 × 10⁻⁵, D = 3.38852 × 10⁻⁷,
E = −2.04437 × 10⁻⁹, F = 0

-continued (seventeenth plane)

k = 3.6599,
A = 0, B = −1.42745 × 10$^{-4}$,
C = 8.50625 × 10$^{-6}$, D = −4.56478 × 10$^{-7}$,
E = 8.64884 × 10$^{-9}$, F = 0
(eighteenth plane)

k = 1.0000,
A = 0, B = −5.92382 × 10$^{-5}$,
C = 8.20070 × 10$^{-6}$, D = −4.29042 × 10$^{-7}$,
E = 7.95619 × 10$^{-9}$, F = 0
(twenty-second plane)

k = 1.0000,
A = 0, B = −7.99966 × 10$^{-5}$,
C = 9.05381 × 10$^{-7}$, D = −3.22230 × 10$^{-8}$,
E = 5.49078 × 10$^{-10}$, F = 0

(Zoom Data)

|       | wide angle | intermediate position | telephoto |
|-------|------------|----------------------|-----------|
| D(5)  | 0.8000     | 36.5962              | 58.6343   |
| D(12) | 37.8121    | 13.3712              | 0.1000    |
| D(18) | 2.2579     | 13.5450              | 25.9125   |
| D(21) | 11.0481    | 12.7909              | 11.3729   |
| D(24) | 7.0717     | 3.8218               | 2.0000    |
| D(26) | 5.5710     | 5.6120               | 5.5867    |

Interval (D2W) between second lens group $G_{42}$ and
  third lens group $G_{43}$ at wide angle edge=38.2121
tan(ωw)=0.8974D2W×(−F2)/
  (Ft×tan(ωw))=
  1.7483          (Values Related to Conditional Expression (1))

(F1×Ft)/(−F2×F3)=
  123.7094        (Values Related to Conditional Expression (2))

Anti-shake coefficient (BXt2) for front group $G_{42F}$ of
  second lens group $G_{42}$ at telephoto edge=
  3.8616BXt
2×tan(ωw)=
  3.4652          (Values Related to Conditional Expression (3))

(Z×Ymax)/(−F2)=
  21.8563         (Values Related to Conditional Expression (4))

Distance (D3T) between third lens group $G_{43}$ and
  fourth lens group $G_{44}$ at telephoto edge=
  25.9125D3T/
  −F4=1.1491      (Values Related to Conditional Expression (5))

Distance (D1T) between first lens group $G_{41}$ and second lens group
  $G_{42}$ at telephoto
  edge=58.6343    (Values Related to Conditional Expression (6))

(D3T×D1T)/(F2×F4)=8.2658

Figure 8:
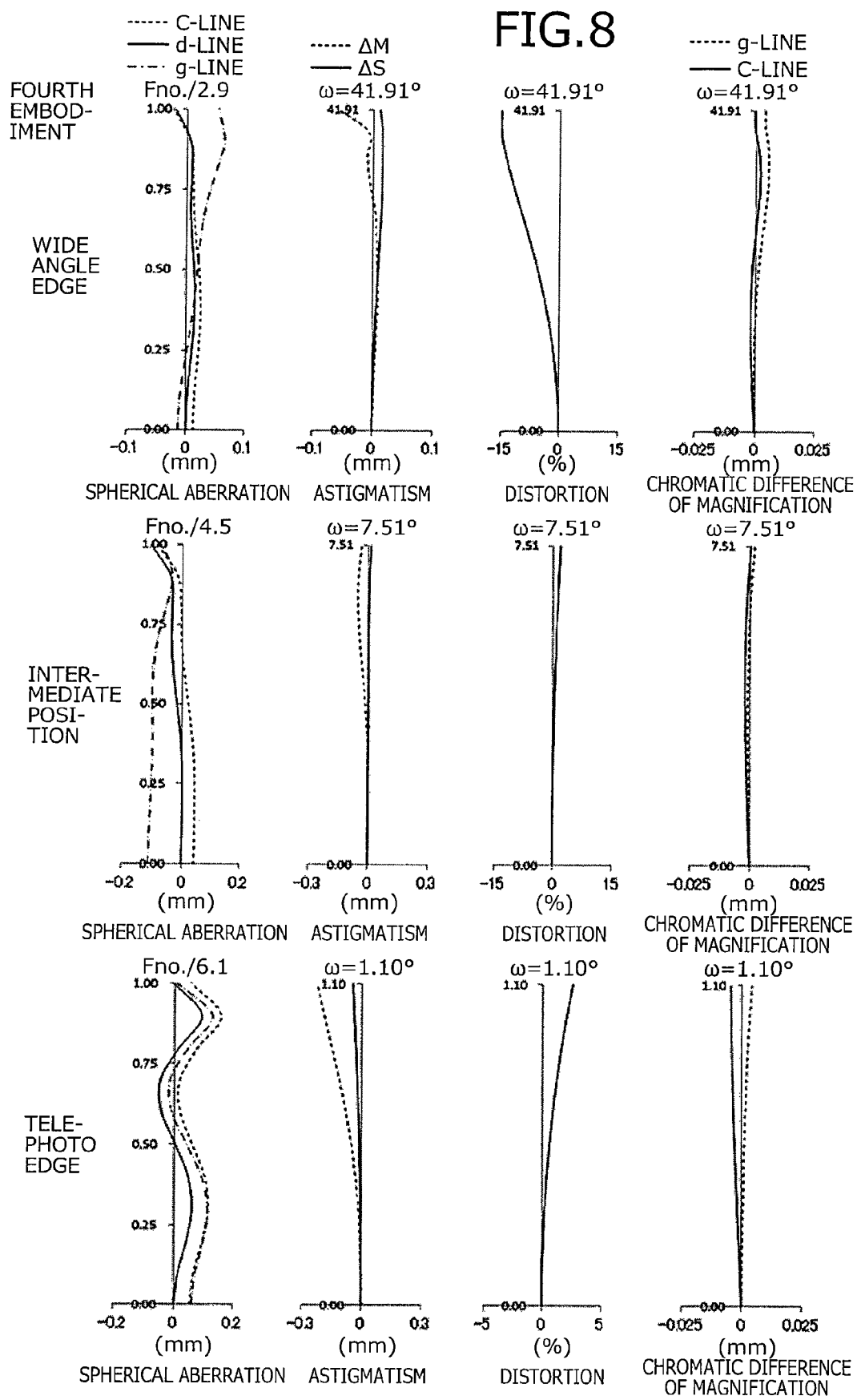
FIG. 8 is a diagram of various types of aberration in the zoom lens according to the fourth embodiment.

FIG. 8 is a diagram of various types of aberration in the zoom lens according to the fourth embodiment. Wavelength aberration corresponding to g-line (λ=435.83 nm), d-line (λ=587.56 nm), and C-line (λ=656.28 nm) is depicted. ΔS and ΔM in a portion depicting astigmatism, indicate aberration with respect to a sagittal image plane and a meridional image plane, respectively.

FIG. 9 is a cross sectional view along the optical axis, depicting a configuration of the zoom lens according to a fifth embodiment. The zoom lens includes sequentially from the object side, a first lens group $G_{51}$ having a positive refractive power, a second lens group $G_{52}$ having a negative refractive power, a third lens group $G_{53}$ having a positive refractive power, a fourth lens group $G_{54}$ having a negative refractive power, a fifth lens group $G_{55}$ having a positive refractive power, and a sixth lens group $G_{56}$ having a negative refractive power. Further, between the second lens group $G_{52}$ and the third lens group $G_{53}$, the aperture stop S that prescribes a given diameter is disposed.

The first lens group $G_{51}$ includes sequentially from the object side, a negative lens $L_{511}$, a positive lens $L_{512}$, and a positive lens $L_{513}$. The negative lens $L_{511}$ and the positive lens $L_{512}$ are cemented.

The second lens group $G_{52}$ includes sequentially from the object side, a negative lens $L_{521}$, a negative lens $L_{522}$, a positive lens $L_{523}$, and a negative lens $L_{524}$. The negative lens $L_{522}$ and the positive lens $L_{523}$ are cemented. Furthermore, both sides of the negative lens $L_{524}$ are aspheric.

The third lens group $G_{53}$ includes sequentially from the object side, a positive lens $L_{531}$, a negative lens $L_{532}$, and a positive lens $L_{533}$. The positive lens $L_{531}$ and the negative lens $L_{532}$ are cemented. Furthermore, both surfaces of the positive lens $L_{533}$ are cemented.

The fourth lens group $G_{54}$ includes sequentially from the object side, a negative lens $L_{541}$ and a positive lens $L_{542}$. The negative lens $L_{541}$ and the positive lens $L_{542}$ are cemented.

The fifth lens group $G_{55}$ includes sequentially from the object side, a positive lens $L_{551}$ and a negative lens $L_{552}$. On the positive lens $L_{551}$, the surface facing toward the object is aspheric. The positive lens $L_{551}$ and the negative lens $L_{552}$ are cemented.

The sixth lens group $G_{56}$ is formed by a negative lens $L_{561}$.

The zoom lens moves the first lens group $G_{51}$ along the optical axis, from the image plane side to the object side; moves the second lens group $G_{52}$ along the optical axis, from the object side to the image plane side; moves the third lens group $G_{53}$ along the optical axis, from the image plane side to the object side; moves the fourth lens group $G_{54}$ along the optical axis, from the object side to the image plane side; and moves the fifth lens group $G_{55}$ along the optical axis, from the object side and back, to zoom from the wide angle edge to the telephoto edge.

The zoom lens moves the fifth lens group $G_{55}$ along the optical axis to perform focusing from infinity to the minimum object distance. Further, the zoom lens shifts the second lens group $G_{52}$ in a direction substantially orthogonal to the optical axis to correct image blur that occurs with optical system vibration consequent to hand-shake.

Various values related to the zoom lens according the fifth embodiment are indicated below.

Focal length of entire zoom lens = 4.7395 (wide angle
  edge) to 43.0117 (intermediate position) to 203.3847 (Ft:
  telephoto edge)
F number (F no.) = 2.9 (wide angle edge) to 5.0 (intermediate
  position) to 6.5 (telephoto edge)
Half-angle (ω) = 41.99 (ωw: wide angle edge) to
  4.93 (intermediate position) to 1.07 (telephoto edge)
Paraxial image height(Y) = 4.27 (Ymax: wide angle edge) to
  3.71 (intermediate position) to 3.80 (telephoto edge)
Focal length (F1) of first lens group $G_{51}$ = 75.1144
Focal length (F2) of second lens group $G_{52}$ = −7.8437
Focal length (F3) of third lens group $G_{53}$ = 17.1792
Focal length (F4) of fourth lens group $G_{54}$ = −31.5511
Focal length of fifth lens group $G_{55}$ = 20.9376
Focal length of sixth lens group $G_{56}$ = −60.5410
Zoom ratio (Z) = 42.9173

(Lens Data)

| | | | |
|---|---|---|---|
| $r_1$ = 97.6858   | $d_1$ = 1.0000 | $nd_1$ = 1.80610 | $υd_1$ = 33.27 |
| $r_2$ = 46.5191   | $d_2$ = 5.2000 | $nd_2$ = 1.43700 | $υd_2$ = 95.10 |
| $r_3$ = −238.2465 | $d_3$ = 0.2000 | | |
| $r_4$ = 43.4953   | $d_4$ = 3.7000 | $nd_3$ = 1.61800 | $υd_3$ = 63.39 |

-continued

| | | | |
|---|---|---|---|
| $r_5 = 198.1204$ | $d_5 = D(5)$ (variable) | | |
| $r_6 = 72.3886$ | $d_6 = 0.5000$ | $nd_4 = 1.69680$ | $vd_4 = 55.46$ |
| $r_7 = 8.6209$ | $d_7 = 4.3094$ | | |
| $r_8 = -21.7879$ | $d_8 = 0.5000$ | $nd_5 = 1.91082$ | $vd_5 = 35.25$ |
| $r_9 = -21.7879$ | $d_9 = 2.4000$ | $nd_6 = 1.94595$ | $vd_6 = 17.98$ |
| $r_{10} = -36.7935$ | $d_{10} = 1.4363$ | | |
| $r_{11} = -13.5739$ (aspheric surface) | $d_{11} = 0.5000$ | $nd_7 = 1.83441$ | $vd_7 = 37.28$ |
| $r_{12} = -24.5104$ (aspheric surface) | $d_{12} = D(12)$ (variable) | | |
| $r_{13} = \infty$ (aperture stop) | $d_{13} = 0.4000$ | | |
| $r_{14} = 22.7781$ | $d_{14} = 2.5000$ | $nd_8 = 1.59349$ | $vd_8 = 67.00$ |
| $r_{15} = -10.8005$ | $d_{15} = 0.5000$ | $nd_9 = 1.80610$ | $vd_9 = 33.27$ |
| $r_{16} = -40.9889$ | $d_{16} = 2.7295$ | | |
| $r_{17} = 108.2255$ (aspheric surface) | $d_{17} = 2.3500$ | $nd_{10} = 1.49710$ | $vd_{10} = 81.56$ |
| $r_{18} = -14.8586$ (aspheric surface) | $d_{18} = D(18)$ (variable) | | |
| $r_{19} = -40.8236$ | $d_{19} = 0.6000$ | $nd_{11} = 1.72342$ | $vd_{11} = 37.99$ |
| $r_{20} = 9.2151$ | $d_{20} = 2.0000$ | $nd_{12} = 1.84666$ | $vd_{12} = 23.78$ |
| $r_{21} = 31.1982$ | $d_{21} = D(21)$ (variable) | | |
| $r_{22} = 19.8859$ (aspheric surface) | $d_{22} = 3.6000$ | $nd_{13} = 1.49710$ | $vd_{13} = 81.56$ |
| $r_{23} = -9.5445$ | $d_{23} = 0.7000$ | $nd_{14} = 1.84666$ | $vd_{14} = 23.78$ |
| $r_{24} = -13.9684$ | $d_{24} = D(24)$ (variable) | | |
| $r_{25} = -15.0000$ | $d_{25} = 0.7000$ | $nd_{15} = 1.80518$ | $vd_{15} = 25.46$ |
| $r_{26} = -22.1184$ | $d_{26} = D(26)$ (variable) | | |
| $r_{27} = \infty$ (image plane) | | | |

Constant of cone (k) and Aspheric coefficients (A, B, C, D, E, F)

(eleventh plane)

k = 1.0000,
A = 0, B = 9.22813 × 10⁻⁵,
C = −5.19243 × 10⁻⁶, D = 1.61167 × 10⁻⁸,
E = 1.38709 × 10⁻⁹, F = −1.11770 × 10⁻¹¹

(twelfth plane)

k = 1.0000,
A = 0, B = 5.80683 × 10⁻⁵,
C = −5.76820 × 10⁻⁶, D = 7.48974 × 10⁻⁸,
E = 0, F = 0

(seventeenth plane)

k = 1.0000,
A = 0, B = −8.93615 × 10⁻⁵,
C = 2.81304 × 10⁻⁶, D = −1.77829 × 10⁻⁷,
E = 3.99999 × 10⁻⁹, F = 0

(eighteenth plane)

k = 1.0000,
A = 0, B = 2.29650 × 10⁻⁶,
C = 2.11271 × 10⁻⁶, D = −1.30186 × 10⁻⁷,
E = 2.86026 × 10⁻⁹, F = 0

(twenty-second plane)

k = 1.0000,
A = 0, B = −7.25054 × 10⁻⁵,
C = 1.47968 × 10⁻⁶, D = −6.55813 × 10⁻⁸,
E = 1.06529 × 10⁻⁹, F = 0

(Zoom Data)

| | wide angle | intermediate position | telephoto |
|---|---|---|---|
| D(5) | 0.9000 | 40.5237 | 55.5639 |
| D(12) | 35.1240 | 9.4972 | 0.1000 |
| D(18) | 2.3271 | 20.9398 | 28.5219 |
| D(21) | 11.0524 | 10.3393 | 12.7390 |
| D(24) | 7.1674 | 4.0999 | 2.1000 |
| D(26) | 4.9956 | 5.0139 | 5.0476 |

Interval (D2W) between second lens group $G_{52}$ and third lens group $G_{53}$ at wide angle edge=35.5240
tan(ωw)=0.9000D2W×(−F2)/
(Ft×tan(ωw))=
    1.5223    (Values Related to Conditional Expression (1))

(F1×Ft)/(−F2×F3)=
    113.3752    (Values Related to Conditional Expression (2))

Anti-shake coefficient (BXt2) for second lens group $G_{52}$ overall at telephoto edge=4.9546BXt2×tan
    (ωw)=4.4589    (Values Related to Conditional Expression (3))

(Z×Ymax)/(−F2)=
    23.3356    (Values Related to Conditional Expression (4))

Distance (D3T) between third lens group $G_{53}$ and fourth lens group $G_{54}$ at telephoto edge= 28.5219D3T/
    −F4=0.9040    (Values Related to Conditional Expression (5))

Distance (D1T) between first lens group $G_{51}$ and second lens group $G_{52}$ at telephoto edge=55.5639    (Values Related to Conditional Expression (6))

(D3T×D1T)/(F2×F4)=6.4038

FIG. 10 is a diagram of various types of aberration in the zoom lens according to the fifth embodiment. Wavelength aberration corresponding to g-line (λ=435.83 nm), d-line (λ=587.56 nm), and C-line (λ=656.28 nm) is depicted. ΔS and ΔM in a portion depicting astigmatism, indicate aberration with respect to a sagittal image plane and a meridional image plane, respectively.

Among the values for each of the examples above, $r_1, r_2, \ldots$ indicate radii of curvature for each lens, diaphragm surface, etc.; $d_1, d_2, \ldots$ indicate the thickness of the lenses, diaphragm, etc. or the distance between surfaces thereof; $nd_1, nd_2, \ldots$ indicate the refraction index of each lens with respect to the d-line (λ=587.56 nm), and $vd_1, vd_2, \ldots$ indicate the Abbe number with respect to the d-line (λ=587.56 nm). Lengths are indicated in units of [mm] and angles are indicated in [degrees].

Each of the aspheric surfaces described above is expressed by equation [1], where X represents a direction of the optical axis; h represents a height from the optical axis; k is the constant of the cone, and A, B, C, D, E, and F are second, fourth, sixth, eighth, tenth, and twelfth order aspheric coefficients. The direction of light is assumed to be positive.

$$X = \frac{h^2/R}{1 + \sqrt{1 - (1+k)(h/R)^2}} + Ah^2 + Bh^4 + Ch^6 + Dh^8 + Eh^{10} + Fh^{12} \quad [1]$$

As described, by satisfying each of the conditional expression above, the zoom lens according to each of the embodiments achieves a compact size, wide angle views (in particular, the angle of view at the wide angle edge is 75 degrees or more), and a high zoom ratio (on the order of 40 times) while enabling imaging performance to be improved. Further, with the zoom lens, the amount that the anti-shake group is shifted when image blur is corrected can be suppressed and the imaging performance when image blur is corrected can be maintained. Moreover, in the zoom lens, aspheric lenses and cemented lenses are disposed as necessary, enabling imaging performance to be further improved.

As described, the zoom lens according to the present invention is useful in digital imaging apparatuses such as digital still cameras and digital video cameras; and is particularly suitable for digital imaging apparatuses of which a compact size and high zoom ratio are demanded.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2013-020888 filed in Japan on Feb. 5, 2013.

What is claimed is:

1. A zoom lens comprising sequentially from an object side:
    a first lens group having a positive refractive power;
    a second lens group having a negative refractive power;
    a third lens group having a positive refractive power;
    a fourth lens group; and
    at least one lens group subsequent to the fourth lens group toward an image plane, wherein
    zooming between a wide angle edge and a telephoto edge is performed by varying intervals between the lens groups, along a direction of an optical axis,
    correction of hand-shake occurring with optical system vibration is performed by shifting any one among the entire second lens group and a portion of lenses forming the second lens group, in a direction that is substantially orthogonal to the optical axis, and
    conditional expression (1) $0.5 \leq D2W \times (-F2)/(Ft \times \tan(\omega w)) \leq 2.0$ and condition expression (2) $90 \leq (F1 \times Ft)/(-F2 \times F3) \leq 200$ are satisfied, where D2W is an interval between the second lens group and the third lens group at the wide angle edge, F1 is the focal length of the first lens group, F2 is the focal length of the second lens group, F3 is the focal length of the third lens group, Ft is the focal length of the optical system overall at the telephoto edge, and $\omega w$ is a half-angle at the wide angle edge.

2. The zoom lens according to claim 1, wherein the fourth lens group has a negative refractive power.

3. The zoom lens according to claim 1, wherein conditional expression (3) $3.1 \leq BXt2 \times \tan(\omega w) \leq 10$ is satisfied, where BXt2 is an anti-shake coefficient (amount of image point shift/amount that an anti-shake group is shifted) for any one among the entire second lens group and a portion of the lenses forming the second lens group, at the telephoto edge.

4. The zoom lens according to claim 1, wherein conditional expression (4) $17 \leq (Z \times Ymax)/(-F2) \leq 35$ is satisfied, where Z is a zoom ratio and Ymax is a maximum paraxial image height at the wide angle edge.

5. The zoom lens according to claim 1, wherein conditional expression (5) $0.5 \leq D3T/-F4 \leq 3.0$ and conditional expression (6) $3.5 \leq (D3T \times D1T)/(F2 \times F4) \leq 15$ are satisfied, where F4 is the focal length of the fourth lens group; D1T is a distance between the first lens group and the second lens group, at the telephoto edge; and D3T is a distance between the third lens group and the fourth lens group.

* * * * *